(12) United States Patent
Kawahara et al.

(10) Patent No.: US 8,656,798 B2
(45) Date of Patent: Feb. 25, 2014

(54) LINEAR ACTUATOR

(75) Inventors: Hiroshi Kawahara, Fujisawa (JP);
Tooru Harada, Fujisawa (JP);
Tomofumi Yamashita, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/516,454

(22) PCT Filed: Apr. 26, 2011

(86) PCT No.: PCT/JP2011/002453
§ 371 (c)(1),
(2), (4) Date: Jun. 15, 2012

(87) PCT Pub. No.: WO2011/135849
PCT Pub. Date: Nov. 3, 2011

(65) Prior Publication Data
US 2012/0247240 A1 Oct. 4, 2012

(30) Foreign Application Priority Data

Apr. 26, 2010 (JP) ................................. 2010-101448
May 10, 2010 (JP) ................................. 2010-108367
Apr. 15, 2011 (JP) ................................. 2011-091091

(51) Int. Cl.
*F16H 1/26* (2006.01)
(52) U.S. Cl.
USPC ........ 74/89.32; 74/89.33; 74/89.36; 74/89.37
(58) Field of Classification Search
USPC ............ 74/89.37, 89.39, 89.32, 89.33, 89.36; 384/37, 38
See application file for complete search history.

(56) References Cited

U.S. PATENT DOCUMENTS

| 808,273 | A | * | 12/1905 | Darlington | .................... | 192/141 |
| 2,356,861 | A | * | 8/1944 | Link | ............................ | 74/89.37 |
| 2,417,434 | A | * | 3/1947 | Mead et al. | ................... | 192/143 |

(Continued)

FOREIGN PATENT DOCUMENTS

| EP | 0 933 565 A2 | 8/1999 |
| FR | 2 535 001 A1 | 4/1984 |

(Continued)

OTHER PUBLICATIONS

International Search Report dated Jun. 14, 2011 with English translation (eight (8) pages).

(Continued)

*Primary Examiner* — Troy Chambers
*Assistant Examiner* — Valentin Craciun
(74) *Attorney, Agent, or Firm* — Crowell & Moring LLP

(57) ABSTRACT

A linear actuator is provided which is able to simplify its structure by adding a stopper function, too, to a detent mechanism and to prevent generation of radial load. The linear actuator comprises a ball screw mechanism, to which a rotational driving force is transmitted, for converting a rotational motion into a linear motion. The ball screw mechanism comprises radially projecting guide projections provided in a linear motion component, and a guide groove arranged in a securing portion facing the linear motion component and is engaged with the guide projections to guide the guide projections in an axial direction. The guide projection has a projection projecting by the predetermined length, while engaging into the guide groove, at a stroke end of the linear motion component and a locking portion provided in a rotary motion component is locked to the projection of the guide projection.

13 Claims, 23 Drawing Sheets

(56) References Cited

U.S. PATENT DOCUMENTS

| | | | | |
|---|---|---|---|---|
| 2,479,019 | A * | 8/1949 | Ochtman | 74/89.42 |
| 2,504,408 | A * | 4/1950 | Griffin | 74/89.37 |
| 2,590,251 | A * | 3/1952 | Hoover | 74/89.37 |
| 3,029,660 | A * | 4/1962 | Sears | 74/89.37 |
| 3,334,948 | A * | 8/1967 | Qvarnstrom | 384/24 |
| 4,566,738 | A * | 1/1986 | Fasth | 384/29 |
| 4,712,440 | A * | 12/1987 | Rousselot | 74/89.39 |
| 4,712,441 | A * | 12/1987 | Abraham | 74/89.38 |
| 4,712,927 | A * | 12/1987 | Arrendiell et al. | 384/23 |
| 4,717,267 | A * | 1/1988 | Barthel | 384/247 |
| 4,783,708 | A * | 11/1988 | Hasegawa | 360/267.6 |
| 4,858,481 | A * | 8/1989 | Abraham | 74/89.38 |
| 4,867,295 | A * | 9/1989 | Metcalf et al. | 192/141 |
| 5,329,825 | A * | 7/1994 | Askins | 74/89.32 |
| 5,461,935 | A * | 10/1995 | Hill | 74/89.38 |
| 5,784,922 | A * | 7/1998 | Ozaki et al. | 74/89.37 |
| 6,101,889 | A | 8/2000 | Laskey | |
| 6,116,106 | A * | 9/2000 | Miyoshi | 74/89.37 |
| 6,935,097 | B2 * | 8/2005 | Eschborn | 60/226.2 |
| 7,217,034 | B2 * | 5/2007 | Moshammer | 384/38 |
| 7,861,611 | B2 * | 1/2011 | Martin et al. | 74/89.37 |
| 7,866,225 | B2 * | 1/2011 | Oberle et al. | 74/89.37 |
| 2003/0074990 | A1 * | 4/2003 | Garrec | 74/89.37 |
| 2003/0179961 | A1 * | 9/2003 | Moshammer | 384/38 |

FOREIGN PATENT DOCUMENTS

| | | |
|---|---|---|
| JP | 2-33171 U | 3/1990 |
| JP | 8-49782 A | 2/1996 |
| JP | 10-215545 A | 8/1998 |
| JP | 2002-181156 A | 6/2002 |
| JP | 2003-120782 A | 4/2003 |
| JP | 2004-116561 A | 4/2004 |
| JP | 2005-163922 A | 6/2005 |
| JP | 2005-299726 A | 10/2005 |
| JP | 2007-333046 A | 12/2007 |
| JP | 2010-31965 A | 2/2010 |
| JP | 2010-270887 A | 12/2010 |

OTHER PUBLICATIONS

Form PCT/IPEA/409 (Jul. 2010).

Notification of Transmittal of Translation of the International Preliminary Report on Patentability (PCT/IB/338) and International Preliminary Report on Patentability (PCT/IPEA/409) dated Dec. 20, 2012 (five (5) pages).

Extended European Search Report dated Sep. 25, 2013 (Thirteen (13) pages).

* cited by examiner

F I G. 23
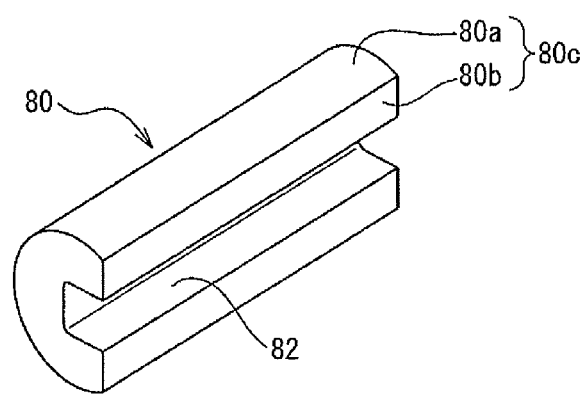

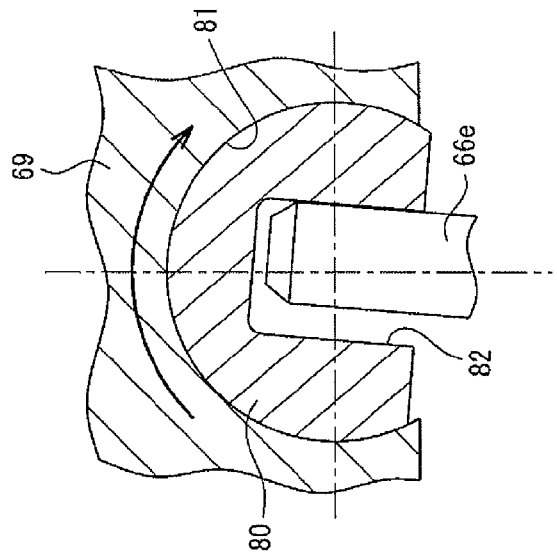
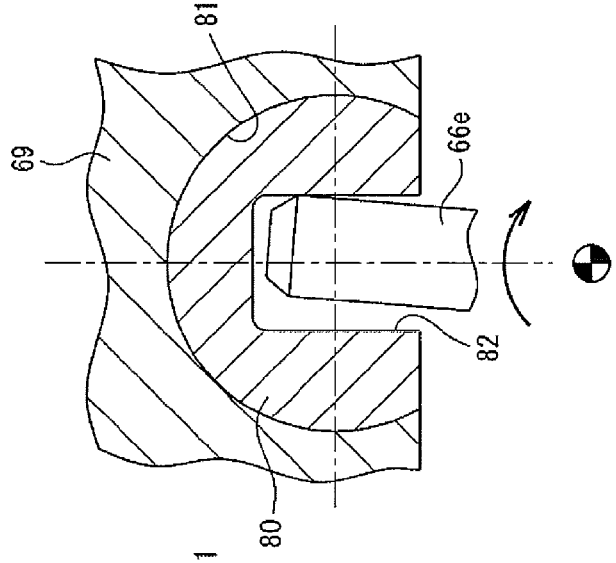
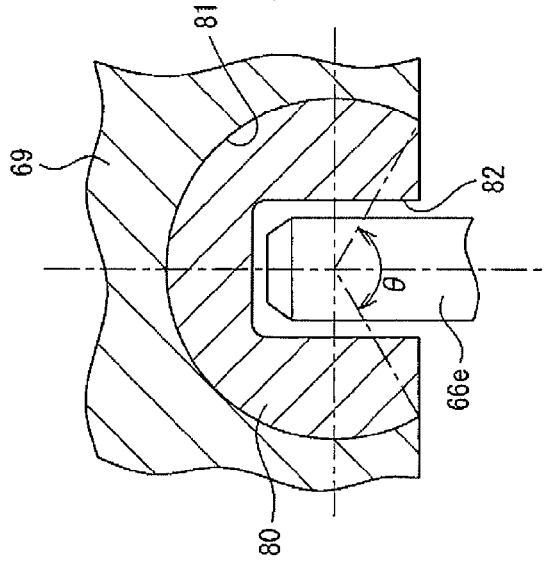

LINEAR ACTUATOR

FIELD OF THE INVENTION

The present invention relates to a linear actuator equipped with a ball screw mechanism for converting a rotational motion transmitted to a rotational motion component into a linear motion.

RELATED ART

Typically, a linear actuator of this kind has a ball screw mechanism with a ball screw shaft and a ball screw nut screwed via a lot of balls into the ball screw shaft. In this actuator, one of the ball screw shaft and the ball screw nut is defined as a rotational motion component for rotational driving, and the other of the ball screw shaft and the ball screw nut is defined as a linear motion component for linear motion. At this time, to assure a linear motion of the linear motion component, it needs to prevent the occurrence of simultaneous rotation with the rotational motion component. A detent is generally attained by engaging a guide projection provided in the linear motion component into a guide groove formed in an axial direction in a securing portion.

For example, it has been known an electric actuator including a ball screw mechanism composed of a nut supported via a rolling bearing mounted on housing movably and not movably in an axial direction; and a ball screw shaft arranged at the interior of the nut via a lot of balls and coaxially integrated with a driving shaft (see Patent Document 1). The electric actuator has a cylindrical sac hole having a flat surface facing each other the housing. A detent member is formed in a rectangular form having a flat surface to be engaged to the flat surface, and movably inserted into the sac hole in an axial direction. Further, a spiral rib is provided on an inner peripheral surface of the detent member. The rib is engaged into a screw groove to hold the screw shaft unrotatably with respect to the housing and movably in an axial direction.

In such an electric actuator, a stopper is provided in the rotational motion component and the linear motion component to restrict stroke in an axial direction of the linear motion component in the rotational motion component and the linear motion component, in order to prevent come-off from a screwed state of the both.

To this end, there has been proposed a ball screw device in which a nut member and a bracket with a C-shaped section to which a rotational driving force is transmitted are integrally provided. A screw shaft securely disposed via balls is screwed with a nut member, a stopper pin is provided in the screw shaft and a cutout is formed in the bracket. When the nut member is rotated while rotating it in a shrinkage direction, the cutout abuts with the stopper pin at a predetermined position for forcibly stopping the nut member (see e.g. Patent Document 2).

Further, there has been proposed a ball screw-type feeder comprising: an inner member on an outer periphery of which a spiral groove raceway is formed; an outer member on an inner periphery of which a spiral groove is formed; a plurality of balls inserted between the two spiral grooves; and an annular cage in which plural pockets are formed to hold the balls, wherein a stopper is provided to engage at least on an end of the spiral groove raceway of the inner member or on an end of the spiral groove raceway of the outer member in a circumferential direction with respect to the cage to restrict movement of the cage in an axial direction (see e.g. Patent Document 3).

Furthermore, there has been proposed an electric actuator in which a flat surface is formed in a large-diameter portion of a ball screw nut. A cam follower is installed in a protruding manner toward the outside in an axial direction at substantially the center of the flat surface. An end of the cam follower is rotatably and slidably fitted in the cutout of the housing for suppressing rotation of the ball screw nut, with the rotation of the ball screw shaft (see e.g. Patent Document 4).

Meanwhile, in the linear motion component, a detent mechanism is provided to suppress simultaneous rotation caused by torque due to the rotational motion component.

To this end, there has been proposed a ball screw including a screw shaft screwed via balls into a nut, wherein a detent member provided in the nut is engaged into a guide groove formed in the housing (see e.g. Patent Document 5). Conversely, there has been also proposed an actuator in which a pin secured to the housing is engaged via a bush, serving as a friction reduction member, into a groove formed in a nut (see e.g. Patent Document 6).

Moreover, there has been proposed an electric actuator in which a flat surface is formed in a large-diameter portion of a ball screw nut. A cam follower is installed in a protruding manner toward the outside in an axial direction at substantially the center of the flat surface, and an end of the cam follower is rotatably and slidably fitted in a cutout of housing to restrict rotation of the ball screw nut, with the rotation of the ball screw shaft (see e.g. Patent Document 7).

PRIOR ART DOCUMENT

Patent Document 1: JP 2010-270887 A
Patent Document 2: JP 2003-120782 A
Patent Document 3: JP 2004-116561 A
Patent Document 4: JP 2002-181156 A
Patent Document 5: JP 2005-299726 A
Patent Document 6: JP 2005-163922 A
Patent Document 7: JP 2007-333046 A

SUMMARY OF THE INVENTION

Problem to be Solved

In the prior art disclosed in Patent Document 1, since there is provided only a detent function not to rotate the screw shaft, serving as the linear motion component. The detent member would abut with the nut and stop at the stroke end, coming into a locked state accordingly.

In order to avoid coming into the locked state at the stroke end, in particular, it is necessary to provide a stopper function to restrict the stroke end for linear motion use, as described in the prior art of Patent Documents 2 and 3. However, the prior art, disclosed in Patent Documents 2 and 3, has only the stopper function to restrict the stroke end of the linear motion component. In this situation, provision of a detent member is separately needed for the detent of the linear motion component.

That is, as shown conceptually in FIGS. 28A and 28B, a ball screw shaft 101 is screwed via balls (not shown) into a ball screw nut 100 to be rotatably driven, a locking projection 102 proximate to the ball screw nut 100 at the stroke end is provided in the ball screw shaft 101, and a locking piece 103 to be locked with the locking projection 102 is provided in the ball screw nut 100. In the ball screw shaft 101, a guide projection 104 is provided in a protruding manner at the opposite side of the locking projection 102 with respect to the ball screw nut 100. The guide projection 104 is engaged into a guide groove 105 formed in a securing portion along the ball screw shaft 101 for enabling the detent function.

In this way, separately providing the stopper function implemented by the locking projection 102 and the locking piece 103, and the detent function implemented by the guide projection 104 and the guide groove 105 remains unresolved, thus leading to a complex structure. Further, when the ball screw shaft 101 reaches the stroke end and the locking piece 103 of the ball screw nut 100 is locked at the locking projection 102, once large torque is input to the ball screw nut 100 rotatably driven, the input torque is transmitted via the locking piece 103 and the locking projection 102 to the ball screw shaft 101. The input torque is finally transmitted to the detent mechanism comprised of the guide projection 104 and the guide groove 105. At this moment, radial load is generated as a reaction force of the input torque between the ball screw nut 100 and the ball screw shaft 101. It is common that the ball screw mechanism is used in a state where the radial load is not applied. Thus, there is an unsolved problem that a situation where the radial load like this is generated is unfavorable.

Moreover, not to rotate the linear motion component, as disclosed in Patent Document 5, the detent member is engaged in an abutment portion of the cutout constituting a guide section of the housing. In this instance, the detent slidingly contacts with the abutment portion of the cutout, thereby generating large contact resistance between the detent member and the abutment portion and frictional wear.

In order to reduce the contact resistance and the frictional wear, in the prior art disclosed in Patent Document 6, it takes steps to reduce the contact resistance between the groove and the projection for suppressing the frictional wear by using a friction reduction member. However, a predetermined gap is normally arranged between the groove and the projection in consideration of variability in assembling and processing performance. Therefore, even when the projection abuts with a groove side wall, the projection and the groove side wall comes into contact with each other at an angle forming a point contact (or line contact), giving rise to high contact pressure at a contact point. There is an unsolved problem that it leads to uneven abrasion and an increased rattle, even for long-term use.

Further, in the prior art disclosed in Patent Document 7, since the cam follower is rotatably and slidably fitted in the groove, it may have some effect on the frictional wear. However, there is an unsolved problem that the provision of the cam follower increases the dimension of the projection and manufacturing cost.

The present invention is made focusing on the above-mentioned unresolved problems in the prior art. A first object of the present invention is to provide a linear actuator the structure of which can be simplified by adding a stopper function to a detent mechanism, and in addition, to prevent the occurrence of radial load.

A second object of the present invention is to provide a linear actuator in which uneven wear can be suppressed without the provision of a cam follower.

Solution to the Problem

To accomplish the above first object, a first aspect of a linear actuator according to the present invention including a rotational motion component and a linear motion component, and comprising a ball screw mechanism to convert a rotational motion transmitted to the rotational motion component into a linear motion, wherein the ball screw mechanism has a guide projection projecting in a radial direction and provided in the linear motion component, and a guide groove engaged with the guide projection and disposed in a securing portion facing the linear motion component to guide the guide projection in an axial direction, and has a structure to make the linear motion component subject not to rotate, and wherein the guide projection is not movable in a circumferential direction at a shaft arranged in the linear motion component and a position of the guide projection is adjustable in an axial direction, and is provided on an outer peripheral surface of a cylindrical body with a shaft end position at the stroke end secured in a finely adjustable manner, and the guide projection has a projection projecting by a predetermined length from the guide groove, while engaging into the guide groove, at a stroke end of the linear motion component, and locks a locking portion provided in the rotational motion component to lock to the projection of the guide projection.

A second aspect of the linear actuator according to the present invention, in the first aspect, the guide projection may be provided on an outer peripheral surface of the cylindrical body on an inner peripheral surface where a spline hole is formed, and the cylindrical body may be secured to the linear motion component with the spline hole engaged with a spline axis provided in the linear motion component.

A third aspect of the linear actuator according to the present invention, in the first or second aspect, the axial length of the guide projection may be set longer than a lead of the ball screw mechanism.

To accomplish the above second object, a fourth aspect of the linear actuator according to the present invention the guide groove is formed in a guide member having a cylindrical outer peripheral surface in the axial direction, and the guide member is rotatably held in a support hole formed in the axial direction at a position, facing the linear motion component, of the securing portion.

A fifth aspect of the linear actuator according to the present invention, in the fourth aspect, the guide member may have a cross-sectional shape having a center angle greater than a semicircle, and the support hole has a cross-sectional shape having an angle greater than a semicircle.

Further, a sixth aspect of the linear actuator according to the present invention, in the fifth aspect, the guide member may be formed of a cylindrical surface having an angle greater than a semicircle and a plane connecting an end of the cylindrical surface, and the guide groove is formed in the plane.

A seventh aspect of the linear actuator according to the present invention, in one of fourth to sixth aspects, the guide member may have on a cylindrical surface a concave groove to be engaged with a projecting rib provided in a circumferential direction formed on an inner peripheral surface of the support hole.

Furthermore, an eighth aspect of the linear actuator according to the present invention, in one of fourth to seventh aspects, the guide projection may have a projection projecting by a predetermined length, while engaging in the guide groove, at a stroke end of the linear motion component, and a locking portion provided in the rotational motion component is coupled to the projection.

A ninth aspect of the linear actuator according to the present invention, in one of the fourth to seventh aspect, a pair of the guide projections may be provided in the linear motion component at a symmetry position with respect to a central axis of the linear motion component, a pair of the support holes are formed at a symmetry position with respect to a central axis of the linear motion component of the securing portion, a pair of the guide members are rotatably held in the pair of the support holes, respectively, and the pair of the guide projections are engaged into the guide grooves of the pair of the guide members, respectively.

Moreover, a tenth aspect of the linear actuator according to the present invention, in one of fourth to ninth, the guide member may be formed by cutting a long member to a predetermined length manufactured by punching.

An eleventh aspect of the linear actuator according to the present invention, in one of fourth to ninth aspects, an external form of the guide member may be formed of a large-diameter portion and a small-diameter portion, and the support hole may have a large-diameter hole and a small-diameter hole respectively engaging to the large-diameter portion and the small-diameter portion of the guide member, and a tapered portion connecting the large-diameter hole to the small-diameter hole.

Moreover, a twelfth aspect of the linear actuator according to the present invention, in one of fourth to eleventh aspects, the guide member may be manufactured by a sintered product.

A thirteenth aspect of the linear actuator according to the present invention, in one of fourth to twelfth aspects, a surface treatment may be applied to the guide member for improving a wear resistance and slidability.

A fourteenth aspect of the linear actuator according to the present invention, in one of fourth to thirteenth aspects, the locking portion may be integrally provided in the rotational motion component, is molded before grooving of at least one of a ball screw groove and a circulating groove of the rotational motion component, and established as a machining reference level for at least one of the ball screw groove and the circulating groove.

Further, a fifteenth aspect of the linear actuator according to the present invention, there is provided a linear actuator including a rotational motion component and a linear motion component, and comprising a ball screw mechanism to convert a rotational motion transmitted to the rotational motion component into a linear motion, wherein the ball screw mechanism has a guide projection projecting in a radial direction and provided in the linear motion component, and a guide groove engaged with the guide projection disposed in a securing portion facing the linear motion component to guide the guide projection in an axial direction, and has a structure to make the linear motion component subject to detent, and wherein the guide groove is formed in a guide member having a cylindrical outer peripheral surface in an axial direction, and the guide member is rotatably held in a support hole formed in an axial direction at a position facing the linear motion component of the securing portion.

Advantageous Effects of the Invention

According to the present invention, the guide projection also serves as the stopper function exhibiting the detent function for the axial motion component of the ball screw mechanism, thereby exhibiting an advantageous effect of simplifying the structure and preventing the generation of the radial load on the ball screw mechanism.

Further, according to the present invention, the cylindrical guide member is provided with the detent groove to be engaged with the projection provided in the axial motion component of the ball screw mechanism, so that the guide member is rotatably supported by the securing portion. Thus, the guide groove to guide the projection follows a slant of the projection, thereby resulting in an advantageous effect of preventing the generation of uneven wear, even for long-term use.

Furthermore, since the guide member and a cross-sectional shape of a support hole supporting the guide member are set to have an angle larger than a semicircle, it is possible to prevent the guide member from falling down toward the axial motion component side.

Moreover, since the guide member and the securing portion are made of different members, it is possible to choose a material depending on its hardness necessary to guide the projection and to conduct necessary surface processing only for the guide member. Hence, cost reduction is achieved.

BRIEF DESCRIPTION OF THE DRAWINGS

FIG. 10 is a view showing a ball nut, in which
FIG. 11 is a view showing a detent member, in which
FIG. 12 is a view showing a guide member, in which
FIG. 23 is a perspective view showing a guide member;
FIG. 24 is an explanation drawing used for an explanation of following of the guide member.

FIG. 28 is a schematic diagram showing prior art, in which

DESCRIPTION OF EMBODIMENTS

Hereinafter, a description will be made to embodiments of the present invention with reference to the accompanying drawings.

Figure 1:
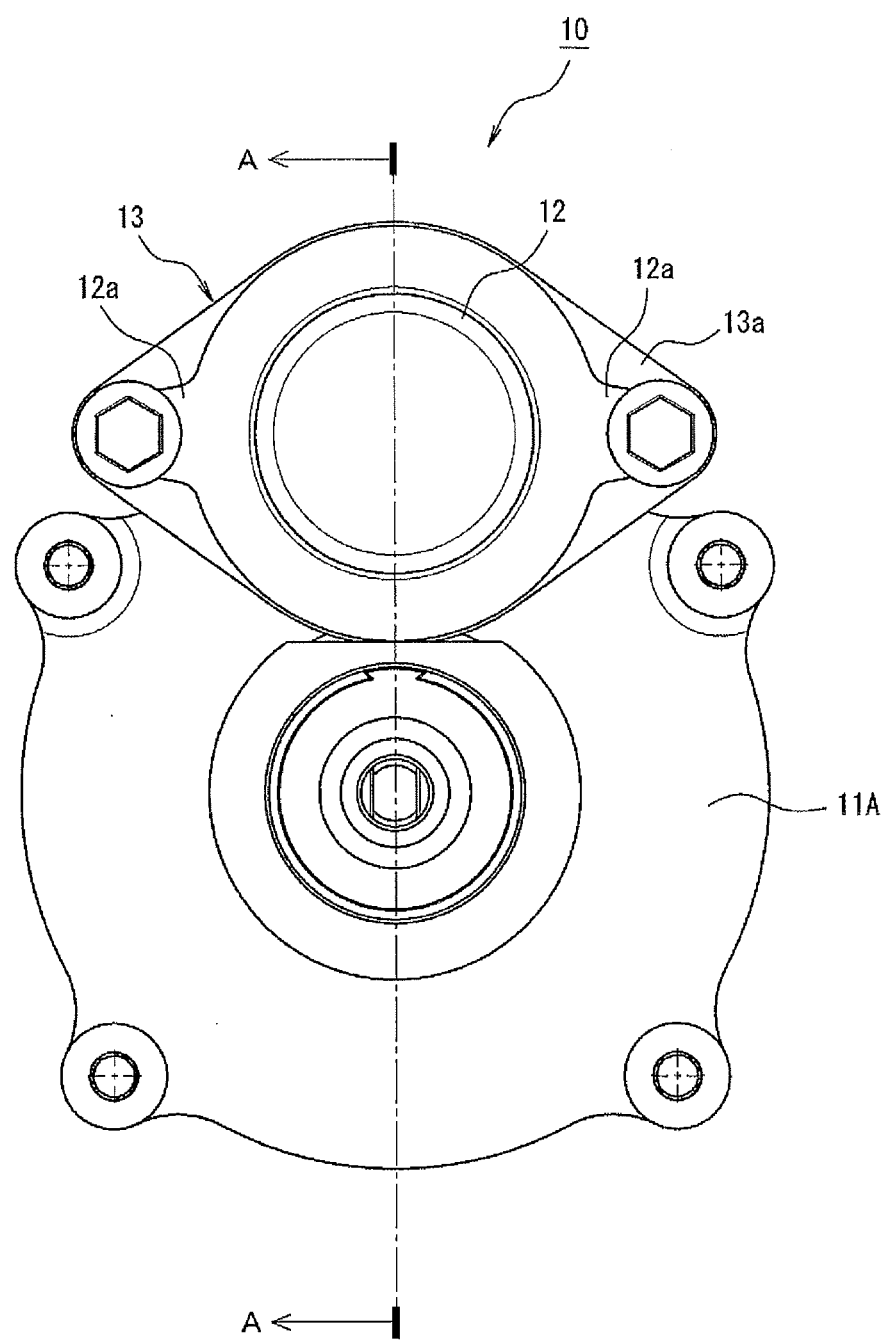
FIG. 1 is a front view showing one embodiment of a linear actuator according to the present invention.
Figure 2:
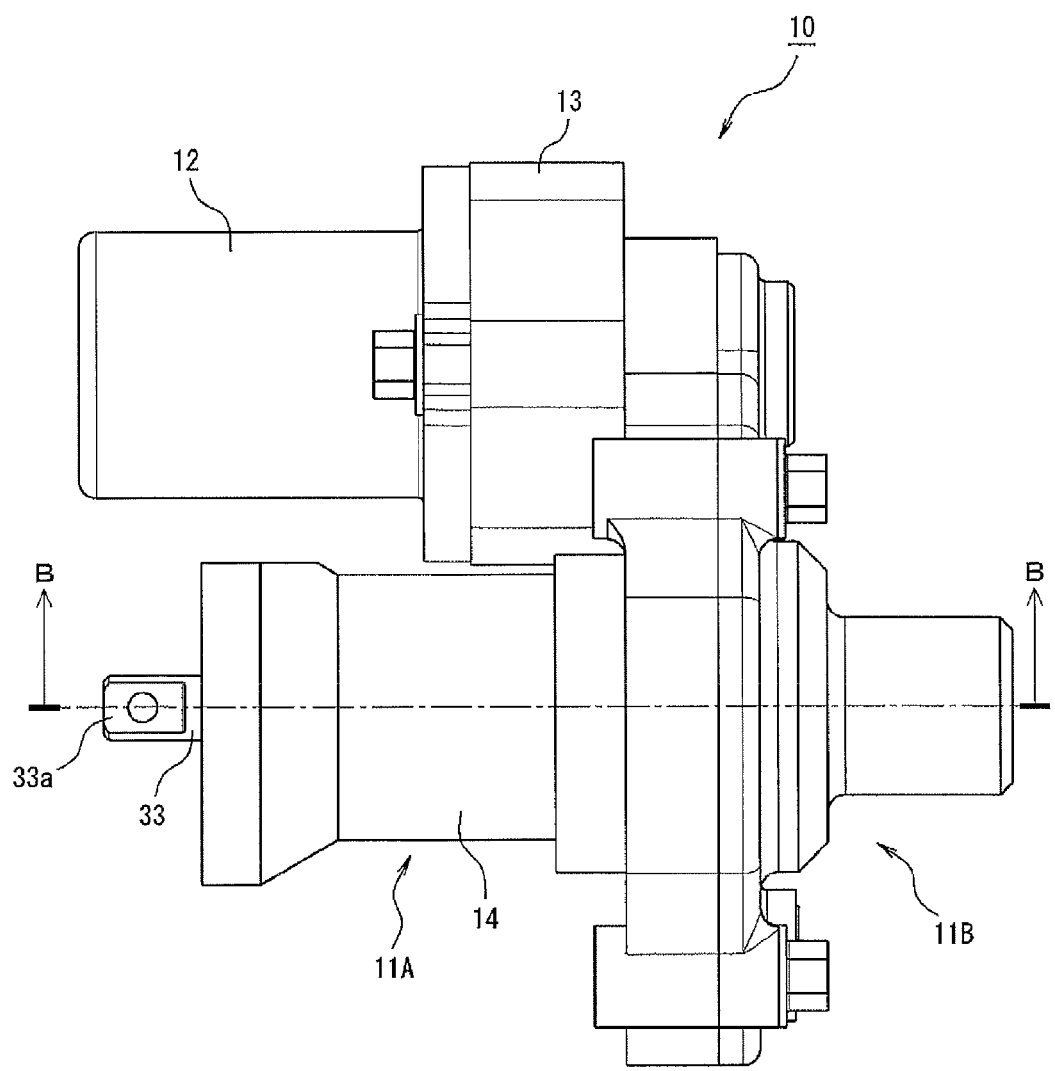
FIG. 2 is a side view of FIG. 1.
Figure 3:
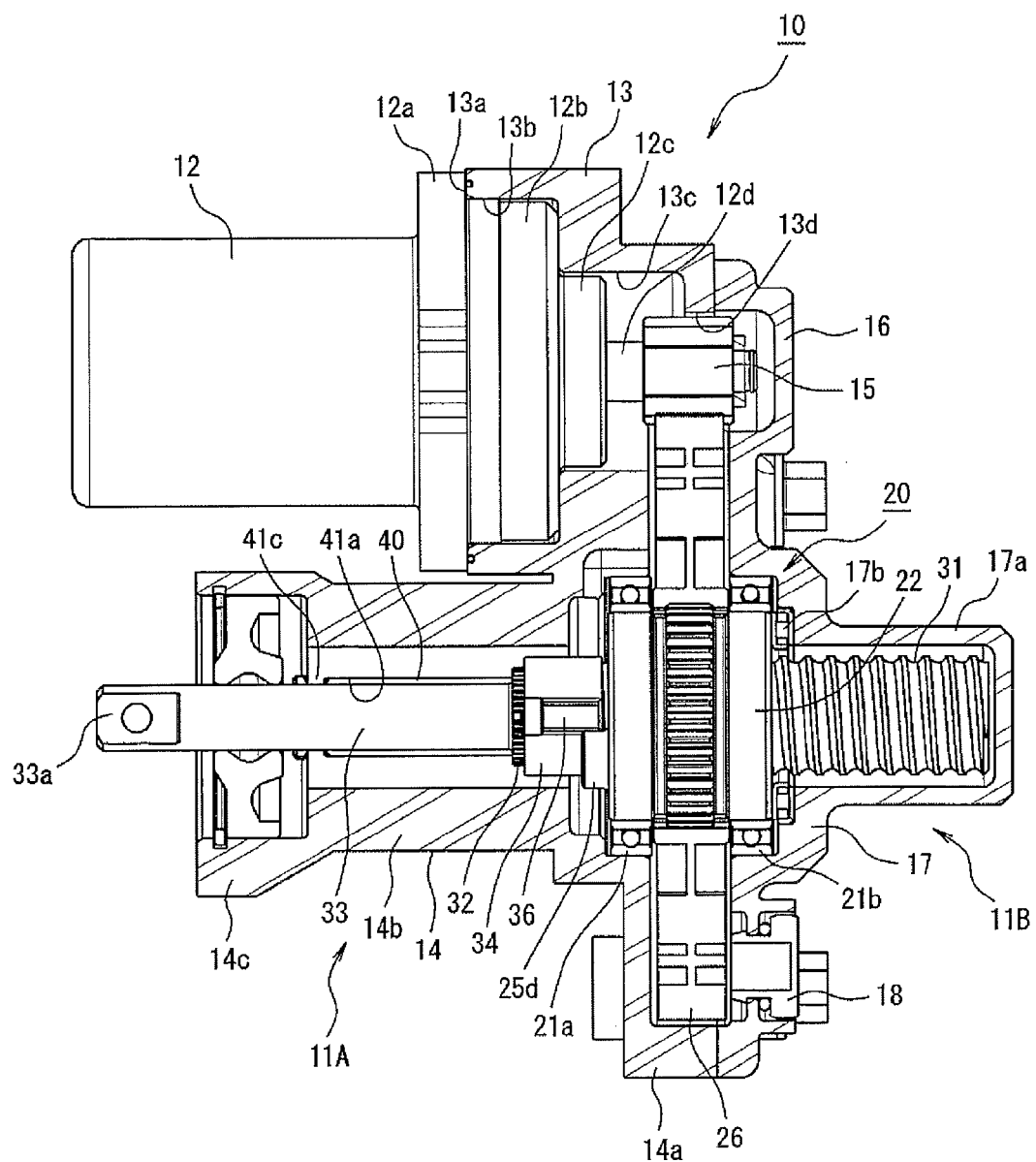
FIG. 3 is a cross-sectional view taken along a line A-A of FIG. 1.
Figure 4:
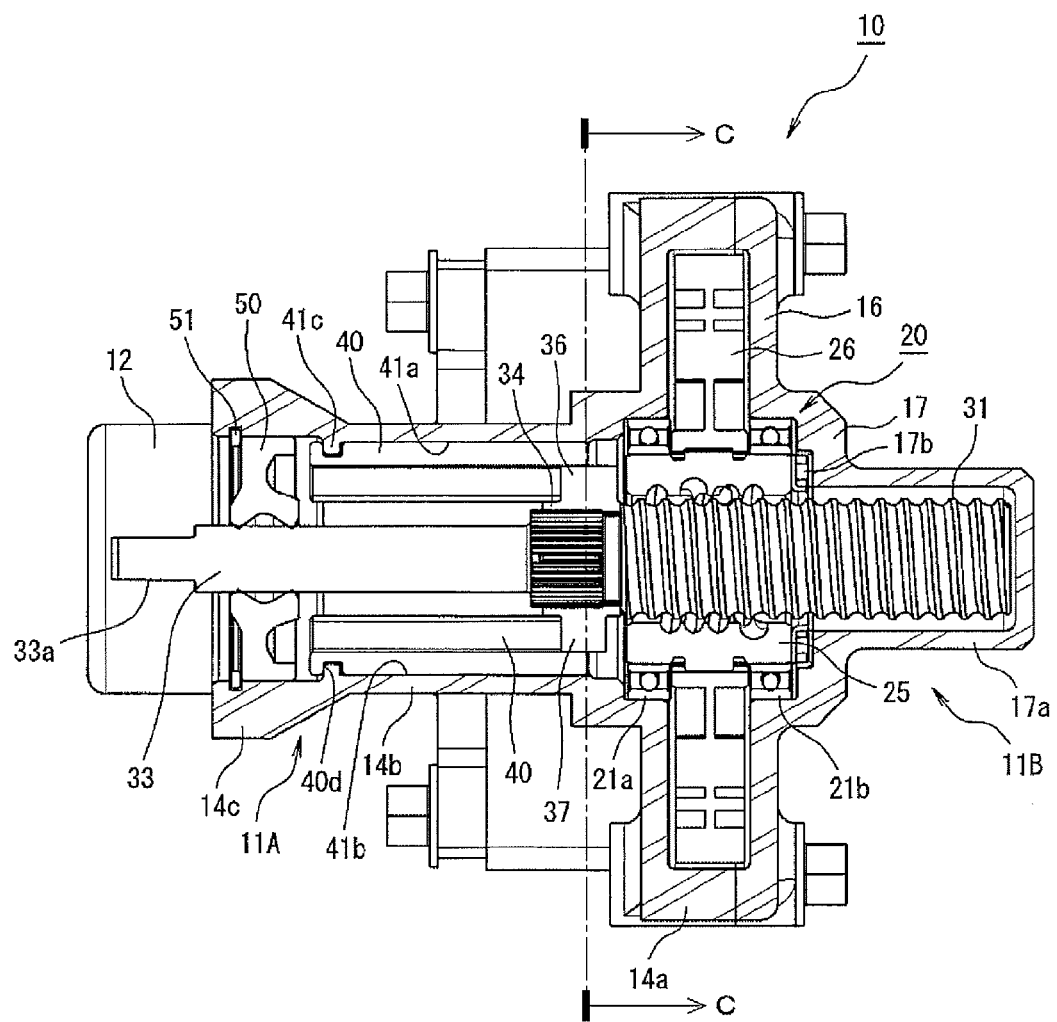
FIG. 4 is a cross-sectional view taken along a line B-B of FIG. 2.

FIG. 1 is a front view showing one embodiment of a linear actuator according to the present invention; FIG. 2 is a side view; FIG. 3 is a cross-sectional view taken along a line A-A of FIG. 1; and FIG. 4 is a cross-sectional view taken along a line B-B of FIG. 2.

In the drawings, reference numeral 10 denotes a linear actuator with a main housing 11A and a sub housing 11B both formed by die-cast molding using, for example, aluminium or aluminium alloy.

Figure 7:
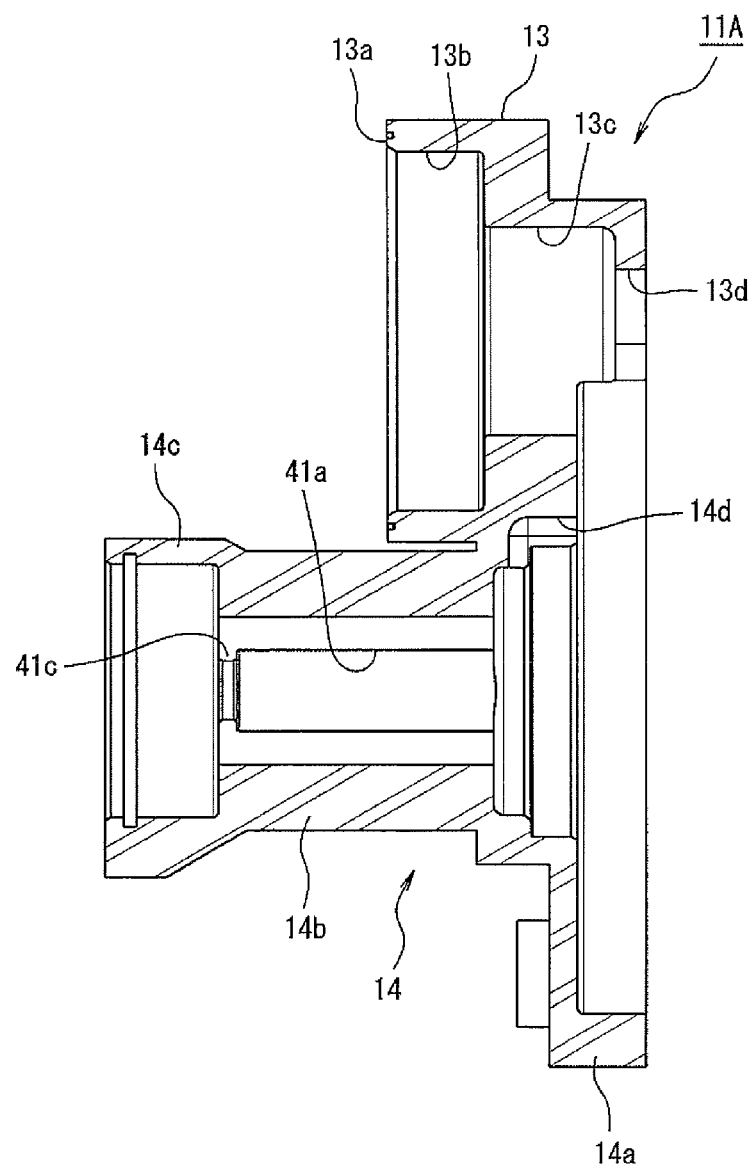
FIG. 7 is a cross-sectional view taken along a line D-D of FIG. 6.

The main housing 11A has, as shown in FIGS. 3 and 7, a motor mounting portion 13 on which an electric motor 12 is mounted at the front side, and a ball screw mechanism mounting portion 14 with the rear side for mounting a ball screw mechanism 20 disposed in parallel with the motor mounting portion 13. These motor mounting portions 13 and the ball screw mounting portion 14 are provided so that their central axes are parallel.

The motor mounting portion 13 has a flange mounting portion 13a to mount a mounting flange 12a of the electric motor 12 provided at the front side; a large-diameter hole 13b into which a large-diameter portion 12b of the electric motor 12 provided at the rear side of the flange mounting portion 13a is inserted; a small-diameter hole 13c into which a small-diameter portion 12c of the electric motor 12 communicating with the rear side of the large-diameter hole 13b is inserted; and a pinion receiving portion 13d communicating with the rear side of the small-diameter portion 13c.

Figure 6:
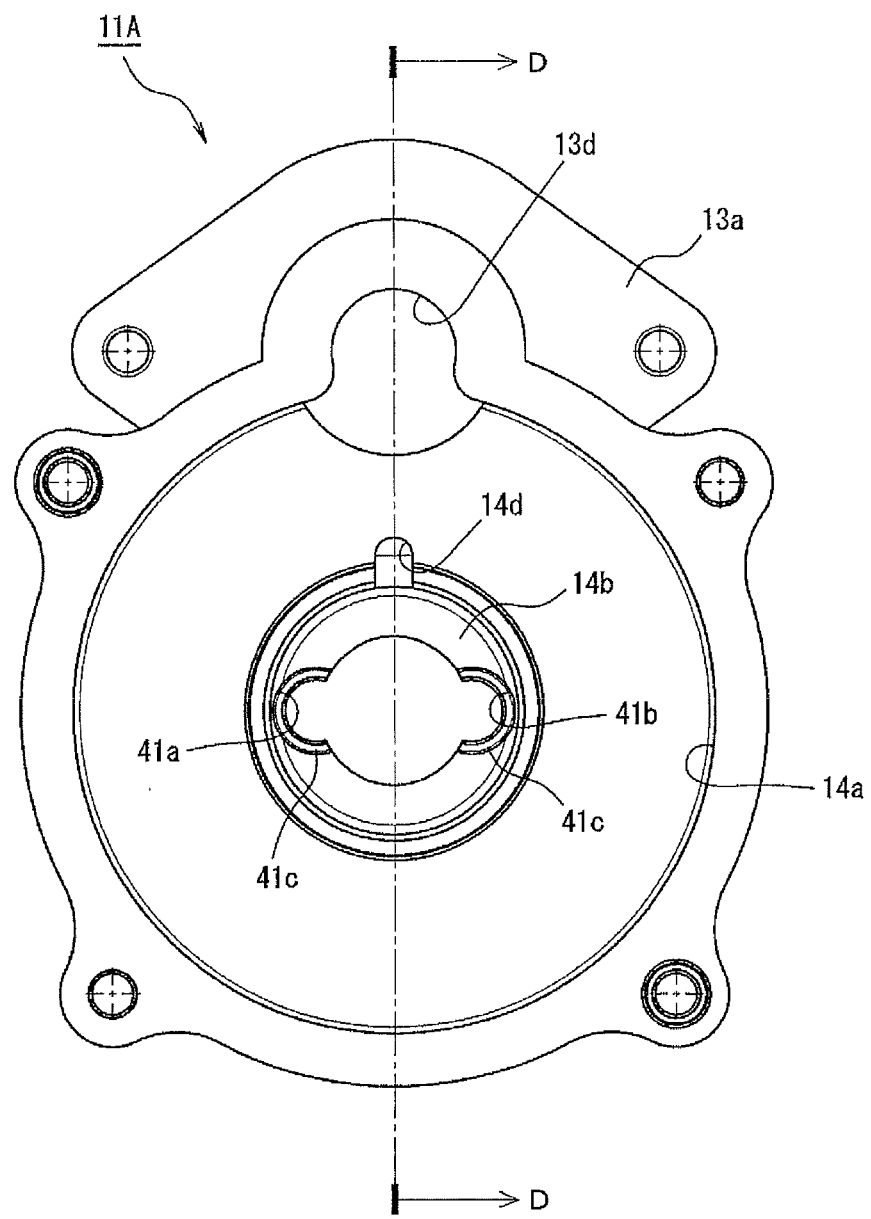
FIG. 6 is a rear view of a housing.

The ball screw mechanism mounting portion 14 has a ball screw mechanism receiving portion 14a provided at a position corresponding to the large-diameter hole 13c of the motor mounting portion 13 provided at the rear side; a cylindrical body 14b extending forward in communication with the ball screw mechanism receiving portion 14a; and a seal receiving portion 14c communicating with the front end of the cylindrical body 14b. In the ball screw mechanism receiving portion 14a, as shown in FIGS. 6 and 7, an air hole 14d is formed to allow air to pass through the cylindrical body 14b.

The sub housing 11B is, as shown in FIG. 3, formed into a shape of covering the pinion receiving portion 13d and the ball screw mechanism receiving portion 14a provided at the rear side of the main housing 11A. The sub housing 11B is provided with a pinion receiving portion 16 and a ball screw mechanism receiving portion 17 correspondingly to the pinion receiving portion 13d and the ball screw mechanism receiving portion 14a of the main housing 11A. In addition, a breather 18 is provided at the lower side. Here, a ball screw receiving portion 17a is provided at the rear side of the ball screw mechanism receiving portion 17. A thrust needle bearing 17b is provided at a position at which the thrust needle bearing 17b comes into contact with an axial end face of the ball screw nut 22, to be mentioned later, of the ball screw receiving portion 17a.

The electric motor 12 has, as shown in FIG. 3, a pinion gear 15 fitted to its end of an output shaft 12d. Then, the electric motor 12 is mounted on the motor mounting portion 13. The electric motor 12 is mounted by inserting the electric motor 12 into the motor mounting portion 13 from the pinion gear 15 side, and by mounting the mounting flange 12a on the flange mounting portion 13a, with the pinion gear 15 received in the pinion receiving portion 13d.

Meanwhile, the ball screw mechanism 20 has a ball screw nut 22, as a rotary motion component, rotatably supported by sealed rolling bearings 21a and 21b in the ball screw receiving portions 14a and 17 of the main housing 11A and the sub housing 14B. The ball screw mechanism 20 also has a ball screw shaft 24, as a linear motion component, to be screwed via a lot of balls 23 into the ball screw nut 22.

The ball screw nut 22 is, as shown in FIG. 10, configured of a cylindrical member 25 on an inner peripheral surface of which a ball screw groove 25a and a ball circulating grooves 25b are formed. Herein, a ball circulating system of the ball screw nut 22, as shown in FIG. 10D, applies, for example, an S-shaped circulating groove 25b existing in each one turn is integrally formed with the ball screw nut 22. The circulating grooves 25b is formed by cold forging and the ball screw groove 25a is formed by machining.

Both axial end sides on an outer periphery surface of the cylindrical member 25 are rotatably supported via the rolling bearings 21a and 21b in the ball screw mechanism receiving portion 14a. An involute spline shaft 25c is provided between inner rings of the rolling bearings 21a and 21b on the outer peripheral surface of the cylindrical member 25. Further, a stopper 25d, serving as a fan-shaped locking portion, when viewed from the front thereof, is integrally projected on an end face at the front side of the cylindrical member 25.

Herein, it is preferable that the stopper 25d should be formed prior to grooving at least one of the ball screw groove 25a and the circulating groove 25b of the ball screw nut 22, serving as the rotary motion component, and the stopper should be taken as a reference for processing of at least one of the ball screw groove 25a and the circulating groove 25b.

Further, the cylindrical member 25 has a driven gear 26 produced by injection molding synthetic resin materials containing e.g. glass fiber, and is spline coupled to the involute spline shaft 25c. The driven gear 26 is meshed with a pinion gear 15 mounted on an output shaft 12d of the electric motor 12. The driven gear 26 has on its inner peripheral surface an involute spline hole 26a to be meshed with the involute spline shaft 25c.

To mount the driven gear 26 on the cylindrical member 25, the involute spline hole 26a of the driven gear 26 is firstly meshed with the involute spline shaft 25c of the cylindrical member 25. Next, the inner rings of the rolling bearings 21a and 21b are press-fitted to abut with an axial end of the inner peripheral surface side of the driven gear 26. This secures the driven gear 26 to the cylindrical member 25 not to be movable in axial and rotational directions.

The ball screw shaft 24 is, as shown in FIGS. 3 and 4, mounted on the cylindrical body 14b provided in the main housing 11A and the ball screw receiving portion 17a provided in the sub housing 11B. The ball screw shaft 24 is, as shown in FIG. 9, composed of: a ball screw 31 provided at the rear end side (left side in FIG. 9) from the center in an axial direction; an involute spline shaft 32 having a small diameter than that of the ball screw 31 and linking to the front end side (right side in FIG. 9) of the ball screw 31; and a coupling shaft 33 having a small diameter than that of the involute spline shaft 32 and linking to a front end of the involute spline shaft 32 and having a width across flat 33a is provided at its end.

Figure 9:
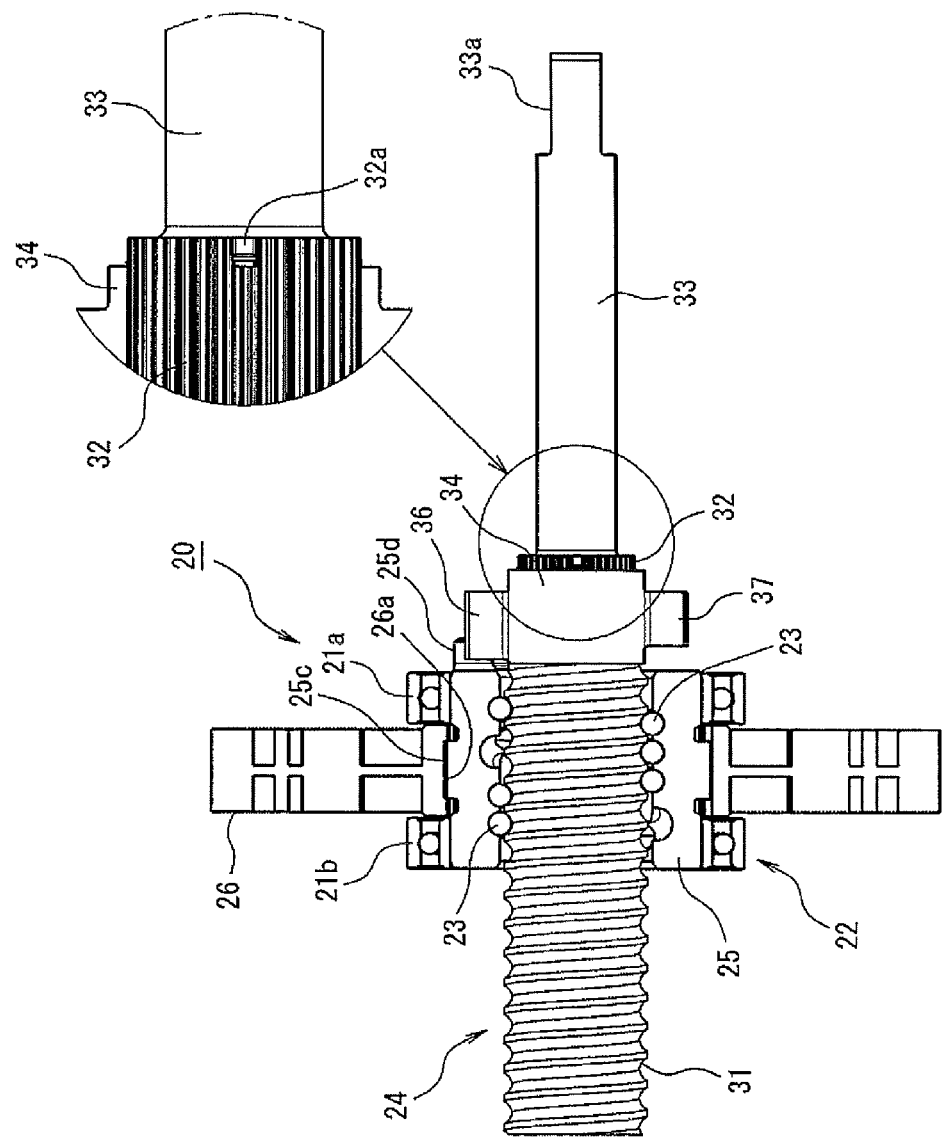
FIG. 9 is a partially enlarged cross-sectional view taken along a line E-E of FIG. 8.
Figure 10A:
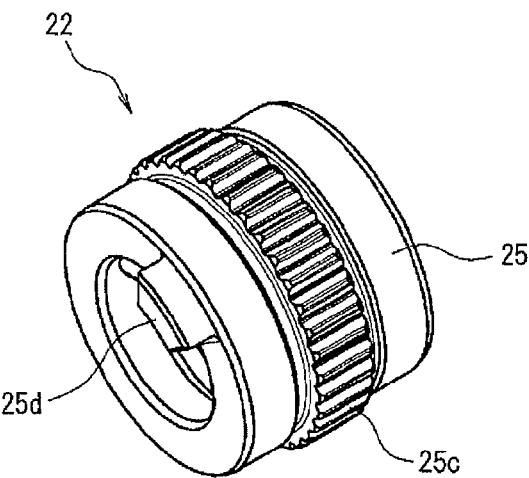
FIG. 10A is a perspective view.
Figure 10B:
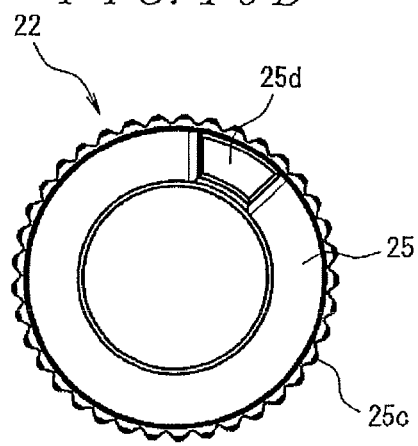
FIG. 10B is a front view.
Figure 10C:
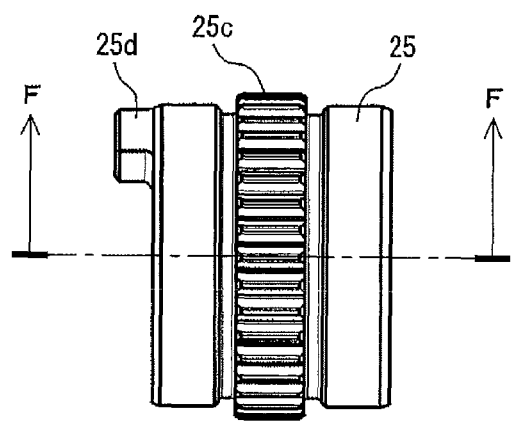
FIG. 10C is a side view.
Figure 10D:
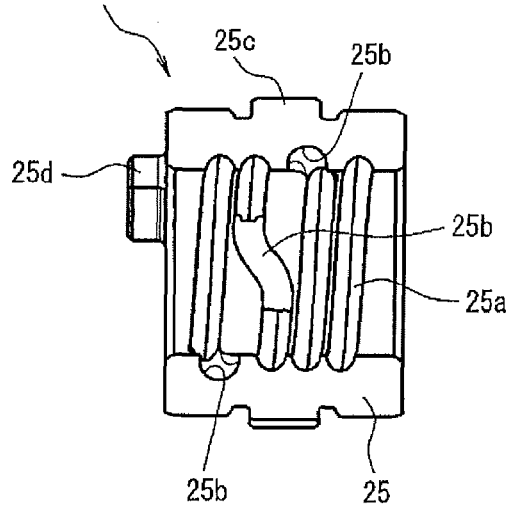
FIG. 10D is a cross-sectional view taken along a line F-F of FIG. 10C.
Figure 11A:
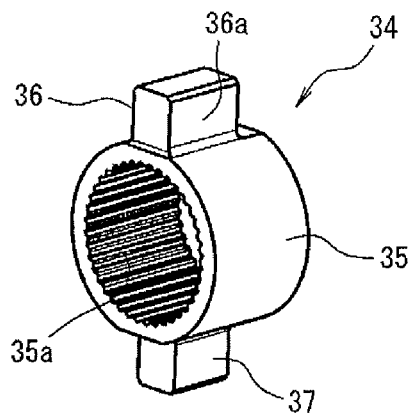
FIG. 11A is a perspective view.
Figure 11B:
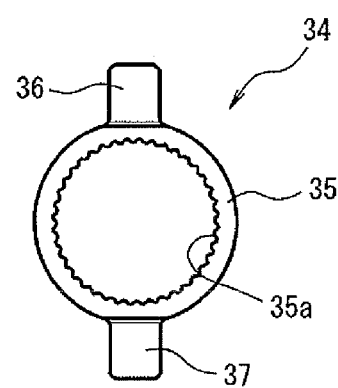
FIG. 11B is a front view.

As shown in FIGS. 3, 4, and 9, the detent member 34 is spline engaged in the involute spline shaft 32 of the ball screw shaft 24. The detent member 34, as shown in FIG. 11, has on its inner peripheral surface a cylindrical portion 35 in which an involute spline hole 35a is formed; and radially projecting guide projections 36 and 37 provided at a symmetry position on an outer peripheral surface of the cylindrical portion 35. Here, the guide projection 36 is set longer in the axial length than that of the guide projection 37, and is provided with a projection 36a that abuts against the stopper 25d arranged in the ball screw nut 22 at the axially rear end side in the stroke end to be mentioned later.

The detent member 34 is, as shown in the enlarged view of FIG. 9, provided with a caulked portion 32a by caulking the front end side of the involute spline shaft 32 from an axial direction at plural point, for example, at four points, up, down, left and right, in a state where the involute spline shaft 32 of the ball screw shaft 24 is spline coupled to the involute spline hole 35a. Consequently, the detent member 34 is fixed to the ball screw shaft 24 by spline coupling not to be rotatable and by means of the caulking portion 32a not to be movable in an axial direction of the ball screw shaft 24.

Figure 14:
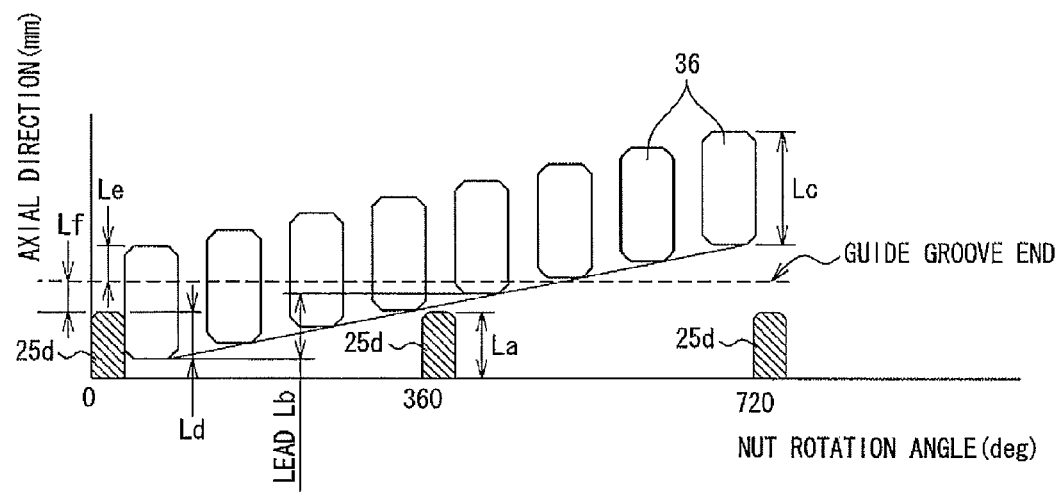
FIG. 14 is an explanation diagram showing a positional relationship between a guide projection and a stopper of a first embodiment.

Here, the axial length Lc of the guide projection 36 is, as shown in FIG. 14, set longer than that a lead Lb of the ball screw groove 25a. In other words, assuming that Ld is the locking length of the projection 36a of the guide projection 36 and the stopper 25d, and Le is the locking length of a guide groove 40c necessary for detent, and Lf is a gap between an axial end of the stopper 25d and an end face at the ball screw nut 22 side of the guide groove 40c, the axial length Lc of the guide projection 36 is set to:

$$Lc = Ld + Le + Lf > Lb \qquad (1)$$

where the locking length Ld is set shorter than the lead Lb (Ld<Lb).

Figure 11C:
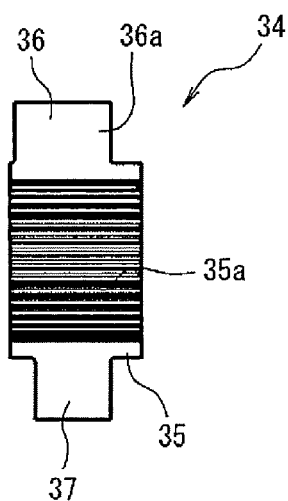
FIG. 11C is a cross-sectional view.

The guide projection 37, as shown in FIG. 11C, the projection length thereof projecting forward is set shorter than that of the guide projection 36. That is, the ball screw nut 22 is rotated in a clockwise direction from the state where the projection 36a of the guide projection 36 shown in FIG. 8 abuts against the stopper 25d and reaches the stroke end. When the stopper 25d reaches a position of overlapping the guide projection 37 in a circumferential direction, the guide projection 37 is set at an axial position where the guide projection 37 does not come into contact with the stopper 25d.

Figure 5:
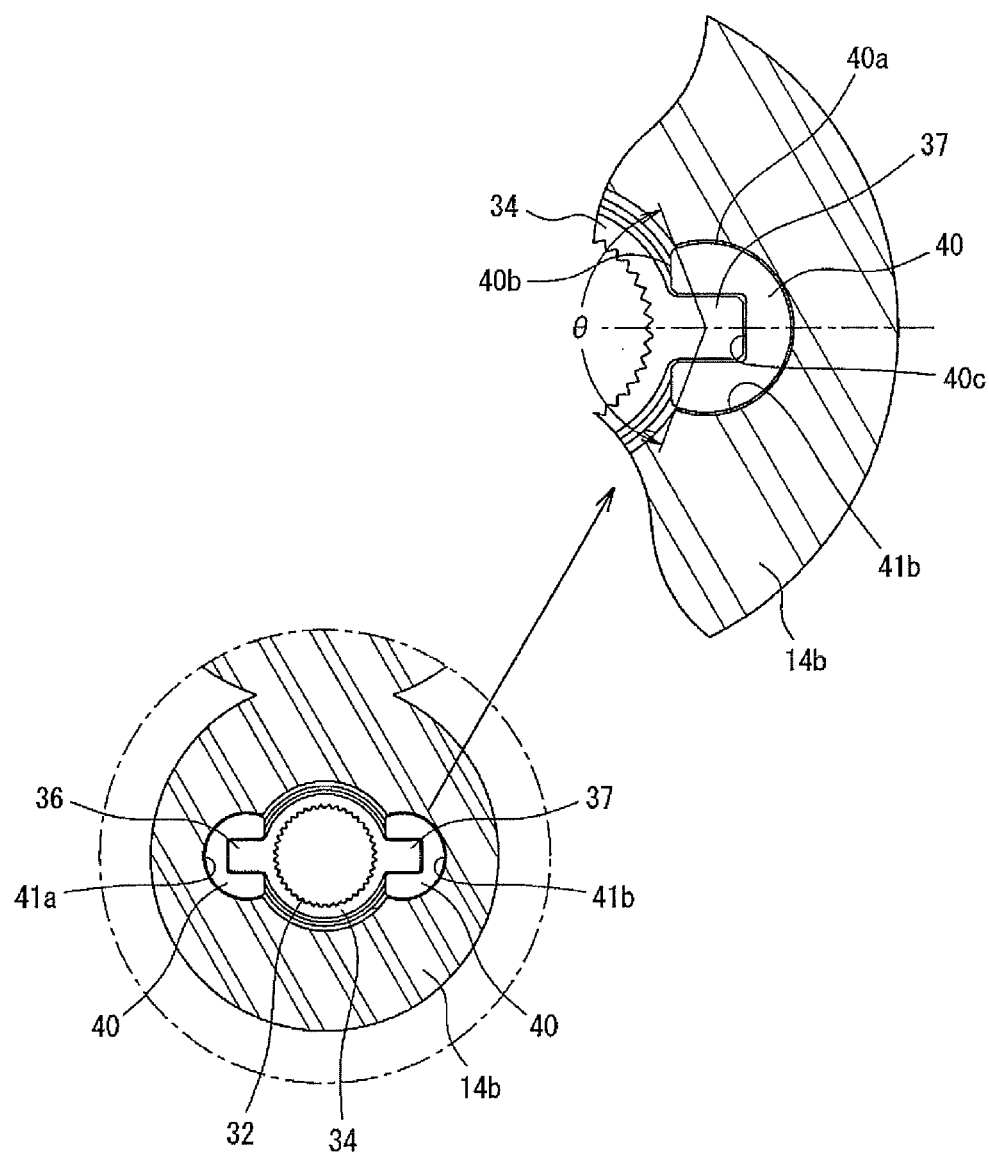
FIG. 5 is a cross-sectional view taken along a line C-C of FIG. 4.

On the other hand, the inner peripheral surface of the cylindrical body 14b of the main housing 11A is provided with, as shown in FIG. 5, support holes 41a and 41b for rotatably holding the guide member 40. These support holes 41a and 41b are formed at symmetry positions through 180 degrees to be elongated in an axial direction. Each of these support holes 41a and 41b is, as shown in the enlarged view of FIG. 5, formed into a shape which has in its cross-section a chord opened to an inner peripheral surface of the cylindrical body 14b so that its shape is larger than a semicircle, its length is shorter than the diameter, and its central angle θ is set smaller than 180 degrees, with an example of 140 degrees.

Thus, when the guide member 40 is held, the support holes 41a and 41b prevent the guide member 40 from falling off therefrom, and from projecting to an inner peripheral surface of the cylindrical body 14b. Front ends of these support holes 41a and 41b open to the seal receiving portion 14c. In the support holes 41a and 41b, a projecting rib 41c inwardly projecting in a radial direction is provided at the front end side (left side in FIG. 4) of these support holes 41a and 41b.

Figure 12A:
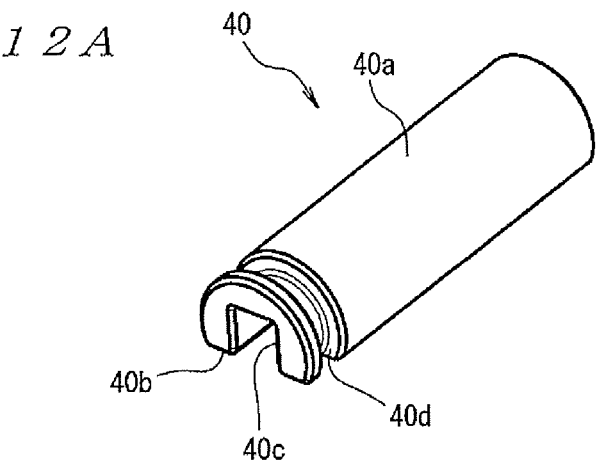
FIG. 12A is a perspective view.
Figure 12B:
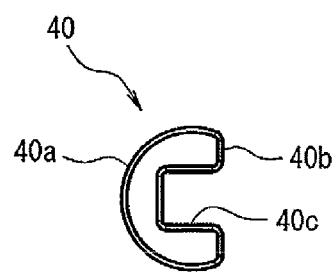
FIG. 12B is a front view.
Figure 12C:
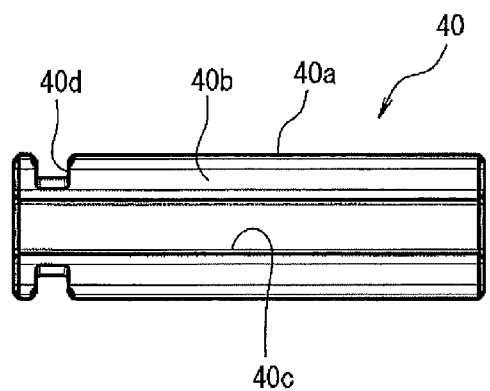
FIG. 12C is a side view.

The guide member 40 is, as shown in FIGS. 4, 5, and 12, formed to have a cross-sectional shape substantially same as the aforementioned support holes 41a and 41b, and is made of, for example, steel. Namely, the guide member 40 is formed of a column produced by axially cutting the cylinder with a chord having the length shorter than the diameter and a central angle θ smaller than 180 degrees, when viewed from its section.

Accordingly, the guide member 40 has a cylindrical surface 40a and a flat surface 40b to have a cross-sectional shape similar to a semicircle or similar to a circle rather than the semicircle. At the center of the flat surface 40b, a guide groove 40c is formed which extends in an axial direction, is deeper than a central axis of an arc of the section, and has a width slightly greater than that of the guide projections 36 and 37 of the detent member 34 of the ball screw shaft 24. Into the guide groove 40c, the guide projection 36 or 37 of the detent member 34 of the ball screw shaft 24 is engaged. Also, on the outer peripheral surface of the front end side of the guide member 40, an engage groove 40d is formed in a circumferential direction to engage with the projecting rib 41c of the support holes 41a and 41b.

The guide member 40 having the above structure is formed by using a die formed into the aforementioned cross-sectional shape and drawing out a round bar to form a long shaped product, and by then cutting this shaped product to a predetermined size. After that, the engage groove 40d is cut on the outer peripheral surface to provide the guide member 40.

Further, in the main housing 11A, as shown in FIGS. 3 and 4, a seal 50 slidingly contact with an outer peripheral surface of the coupling shaft 33 of the ball screw shaft 24 is attached to the seal receiving portion 14c of the ball screw mechanism mounting portion 14, and the seal 50 is secured by a snap ring 51.

An explanation will next be made to an assembly method of the linear actuator 10.

Figure 13A:
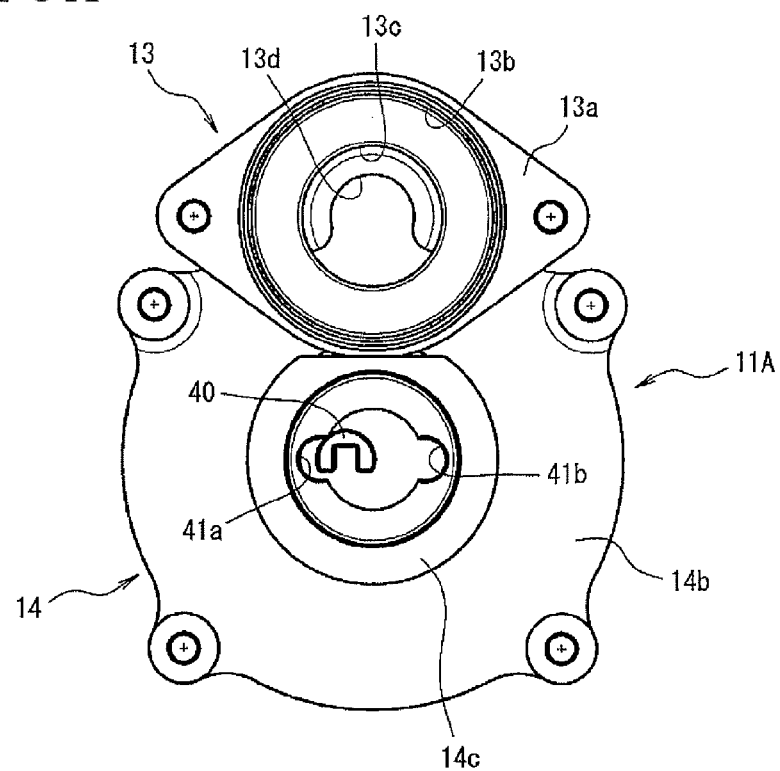
FIG. 13 is a front view showing an installation method of the guide member.

Firstly, the guide member 40 is respectively attached for holding it with the support holes 41a and 41b of the main housing 11A. To attach the guide member 40 in the support hole 41a (or 41b), firstly, as shown in FIG. 13A, the guide member 40 is inserted into the cylindrical body 14b, through the seal receiving portion 14c of the main housing 11A, with the guide groove 40c of the guide member 40 facing downward (a direction in which a depth direction of the support holes 41a and 41b is substantially parallel with the flat surface 40b).

Figure 13B:
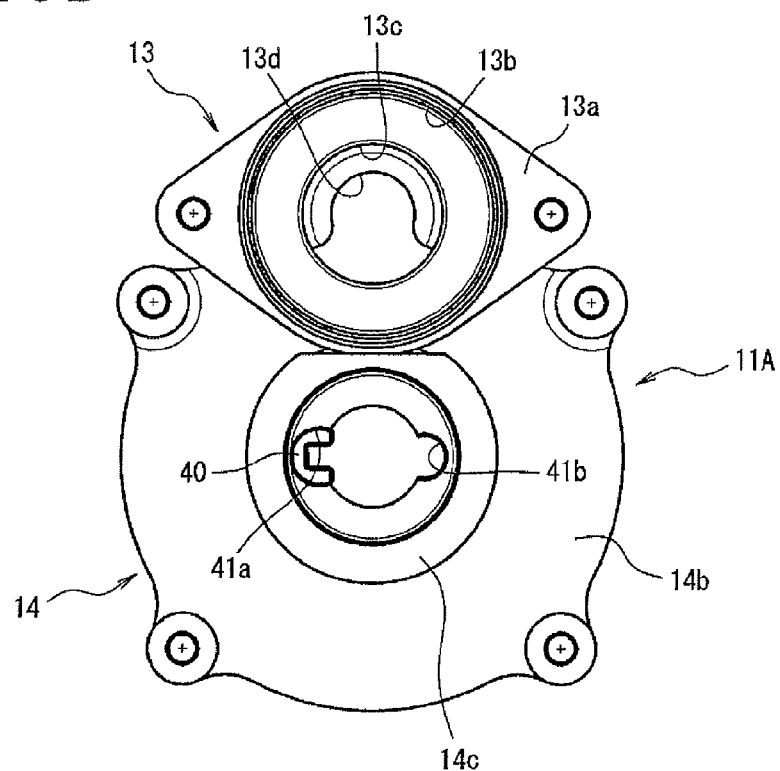

Thereafter, the guide member 40 is inserted into the support hole 41a (or 41b) with the engage groove 40d of the guide member 40 facing the projecting rib 41c of the support hole 41a (or 41b), so that the projecting rib 41c is engaged into the engage groove 40d. After that, by rotating the guide member 40 in a counterclockwise direction (or clockwise direction) in FIG. 13A, the guide member 40 is held in the support hole 41a (or 41b) with the guide groove 40c being opened to the inner peripheral surface side of the cylindrical body 14b, as shown in FIG. 13B. At this time, the projecting rib 41c provided in the support hole 41a (or 41b) engages into the engage groove 40d of the guide member 40, thereby preventing the guide member 40 from moving in an axial direction.

Meanwhile, the ball screw mechanism 20 is separately assembled. The ball screw mechanism 20 is assembled in the following procedure. The driven gear 26 is firstly spline coupled at the axial center on an outer peripheral surface of the cylindrical member 25 of the ball screw nut 22, the rolling bearings 21a and 21b are mounted on the both sides thereof, and the driven gear 26 is secured to inner rings of these rolling bearings 21a and 21b.

Before or after that, the ball screw shaft 24 is screwed via the balls 23 into the ball screw nut 22. Before or after that, the involute spline shaft 32 is caulked with the detent member 34 spline coupled to the ball screw shaft 24, so that the detent member 34 is secured to the ball screw shaft 24 not to be movable in axial and rotational directions. This produces the ball screw mechanism 20 shown in FIG. 9.

Here, a mounting position of the detent member 34 is set to a position where the projection 36a of the guide projection 36 projects in an axial direction from the guide groove 40c, at the stroke end capable of preventing the balls located between the ball screw nut 22 and the ball screw shaft 24 from coming off outward, and the stopper 25d of the ball screw nut 22 abuts with the projection 36a.

Then, the ball screw mechanism 20 is inserted into the ball screw mechanism receiving portion 14a of the main housing 11A from the coupling shaft 33 side, and the guide projections 36 and 37 of the detent member 34 are engaged into the guide groove 40c of the guide member 40 mounted on the main housing 11A. Finally, the driven gear 26 is received in the ball screw mechanism receiving portion 14a, while an outer ring of the rolling bearing 21a is being fitted to an inner peripheral surface of the ball screw mechanism receiving portion 14a. Thereby, the mounting of the ball screw mechanism 20 on the main housing 11A is completed.

Afterwards, the electric motor 12 is inserted into the motor mounting portion 13 of the main housing 11A from the pinion gear 15 side, and then the pinion gear 15 is meshed with the driven gear 26 of the ball screw mechanism 20. Subsequently, the mounting flange 12a of the electric motor 12 is secured to the flange mounting portion 13 by bolting.

Alternatively, the electric motor 12 on the main housing 11A may be mounted before the ball screw mechanism 20 is mounted on the main housing 11A.

In this way, when mounting of the electric motor 12 and the ball screw mechanism 20 on the main housing 11A are finished, the sub housing 11B is mounted on the rear side of the main housing 11A via a packing, not shown, to secure the sub housing 11B with securing means such as by bolting. A seal 50 is inserted into the seal receiving portion 14c of the main housing 11A and is prevented from falling off with the snap ring 51, then assembly of the linear actuator 50 is completed.

Figure 15:
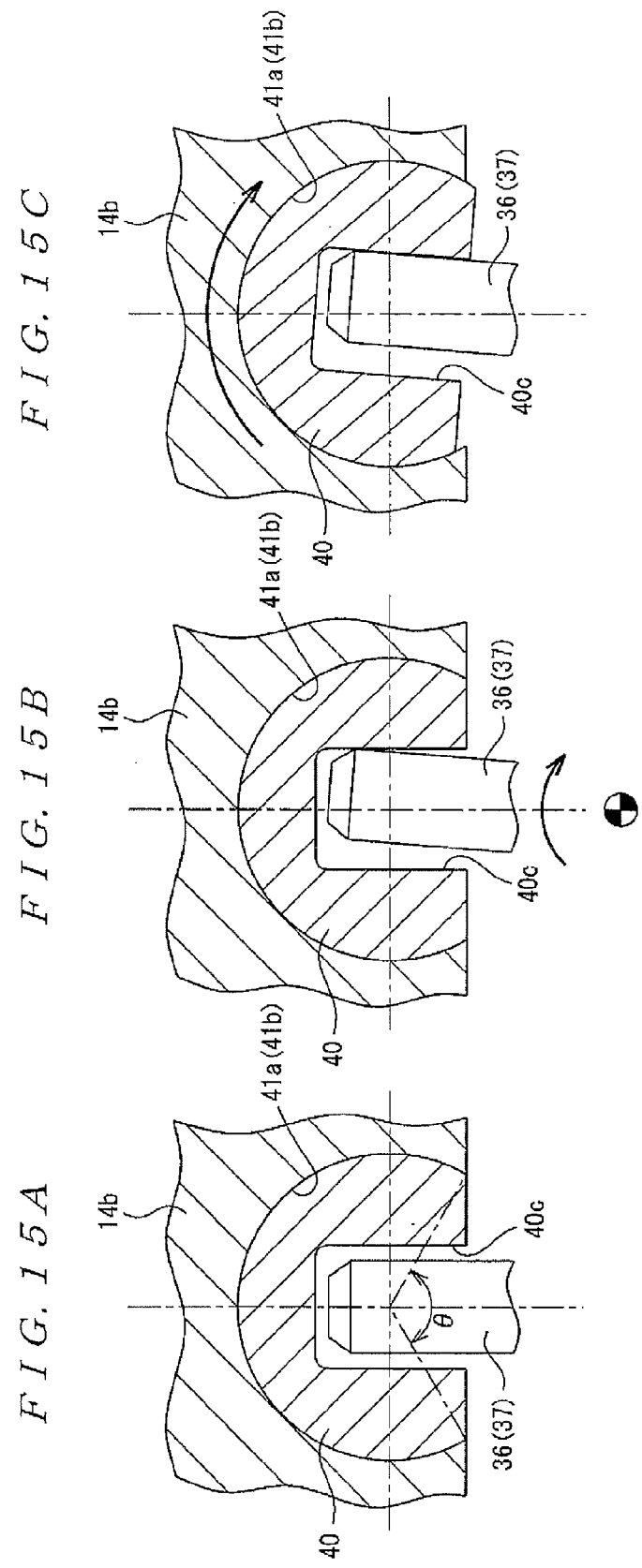
FIG. 15 is an explanation diagram used for an explanation of following of the guide member of a first embodiment.

In this assembly completed state, as shown in FIGS. 4 and 5, the guide projections 36 and 37 of the detent member 34 are engaged into the guide groove 40c of the guide member 40. At this moment, the guide groove 40c and the guide projections 36 and 37 are, as shown in FIG. 15A, selected so that the width of the guide groove 40c slightly gets larger than those of the guide projections 36 and 37.

Figure 8:
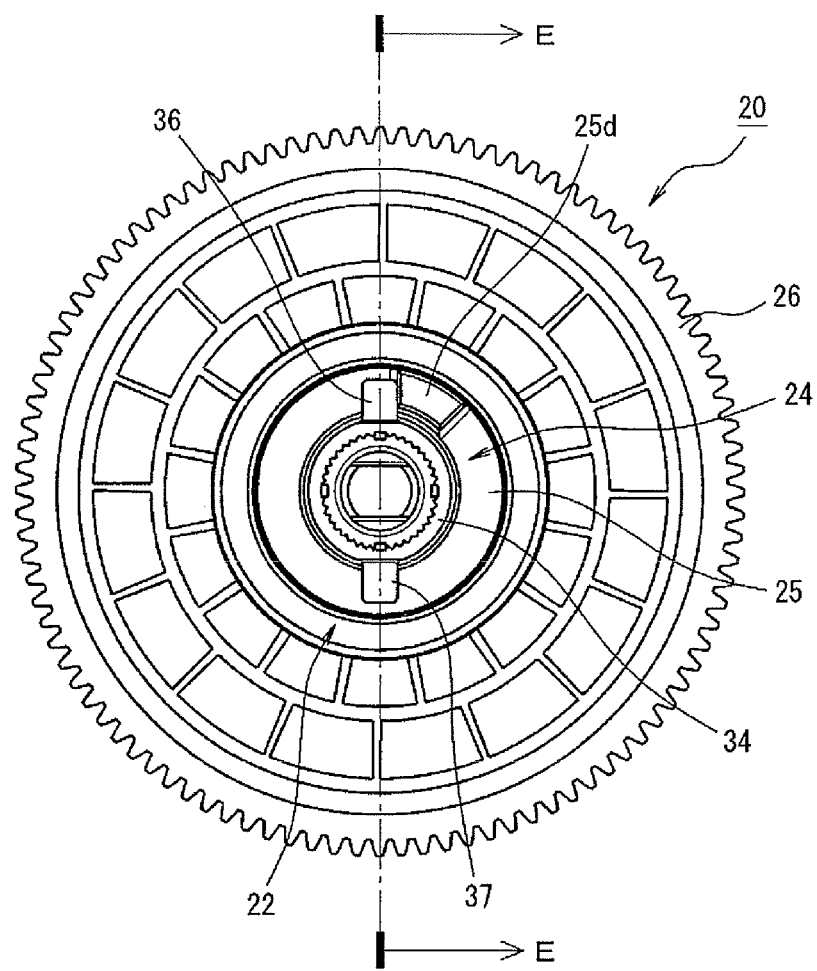
FIG. 8 is a front view of a ball screw mechanism.

In this state, a situation is considered where the electric motor 12 is rotary driven to transmit a rotational diving force from the pinion gear 15 to the driven gear 26, and the ball screw nut 22 is rotated in a clockwise direction, for example, in FIG. 8. In this instance, the rotational force of the ball screw nut 22 is transmitted via a ball 23 to the ball screw shaft 24, and therefore the ball screw shaft 24 is rotated in a clockwise direction which is the same direction as the ball screw nut 22. At this time, the guide projections 36 and 37 are, as shown in FIG. 15B, also rotated in a clockwise direction, and ends of the guide projections 36 and 37 engage the right side surface of the guide groove 40c, coming into a line contact state, accordingly.

However, since the guide member 40 is rotatably supported by the support holes 41a and 41b of the main housing 11A, when the guide projections 36 and 37 are rotated in a clockwise direction, the ends of the guide projections 36 and 37 press the right side of the guide groove 40c in a clockwise direction.

At this moment, a contact point of the guide projections 36 and 37 is located at the outside of a central axis of the guide member 40. Hence, with the rotation of the guide member 40, as shown in FIG. 15C, in a clockwise direction, the guide projection 36 and 37 rotate so that sides of the guide projection 36 and 37 come to a surface contact state following the right side surface of the guide groove 40c. In this surface contact state, the rotation of the guide projections 36 and 37 in a clockwise direction is restricted. For this reason, further rotation of the guide projections 36 and 37 can be restricted. Thereby, the rotation of the ball screw shaft 24 is restricted to exhibit a detent function.

The ball screw nut 22 continuously rotates in a clockwise direction in FIG. 8, and then the ball screw shaft 24 moves to the left as shown in FIGS. 3 and 4. At this time, the ball screw shaft 24 is moved in an axial direction, while keeping a surface contact state shown in FIG. 15C between the guide projections 36 and 37 and the guide groove 40c of the guide member 40.

Thus, the guide projections 36 and 37 in contact with the guide groove 40c in the surface contact state ensures secure prevention of uneven wear in the guide projections 36 and 37 and the guide groove 40c of the guide member 40, even for long-term use.

Similarly, when the electric motor 12 is reversely rotated to transmit a rotational force in a counterclockwise direction to the ball screw shaft 24 in FIG. 8, the left side surfaces of the guide projections 36 and 37 come into contact with the left side surface of the guide groove 40c of the guide member 40 in the surface contact state, and moves in an axial direction. This equally securely prevents uneven wear in the guide projections 36 and 37 and in the guide groove 40c of the guide member 40.

Then, when the ball screw nut 22 is rotated in a clockwise direction from the stroke end, the stopper 25d reaches a position of the guide projection 37. As the projection length toward the rear end side of the guide projection 37 is set shorter than that of the guide projection 36, the stopper 25d never comes into contact with the rear end of the guide projection 37. Afterwards, when the ball screw nut 22 is rotated one turn from the stroke end, as shown in FIG. 14, an end of the stopper 25d of the ball screw nut 22 is separated apart from the rear end of the guide projection 36, as is evident from a relationship of the locking length Ld<lead Lb. This avoids a circumstance where the stopper 25d abuts with an end face in a circumferential direction of the guide projection 36.

After that, when the ball screw nut 22 continues to rotate and the ball screw shaft 24 reaches a desired forward position, a forward movement of the ball screw shaft 24 can be ceased by stopping the rotation of the electric motor 12.

Thereafter, when the ball screw shaft 24 reversely drives from a state where the ball screw shaft 24 reaches a desired forward position at the forward side to rotate the ball screw nut 22 in a counterclockwise direction shown in FIG. 8, the ball screw shaft 24 retreats in an axial direction, as the guide projections 36 and 37 of the ball screw shaft 24 are engaged into the guide groove 40c of the guide member 40 and come into a detent state.

When the guide projection 36 of the ball screw shaft 24 reaches a position (one turn short of the stroke end) facing the stopper 25d of the ball screw nut 22, the stopper 25d never comes into contact with the guide projection 36, as is evident from a relationship of the locking length Ld<lead Lb, as described above. This allows a reverse rotation of the ball screw nut 22. Therefore, the rear end of the guide projection 36 enters a trajectory of the end of the stopper 25d provided in the ball screw nut 22.

Then, even when the ball screw shaft 24 further retreats and the stopper 25d reaches a position of the guide projection 37, a reverse rotation of the ball screw nut 22 is allowed without the stopper 25d abutting with the groove projection 37, as the projection length of the guide projection 37 in a backward direction is shorter than that of the guide projection 36, as mentioned above.

After that, as shown in FIG. 8, the stopper 25d abuts with an end face in a circumferential direction of the projection 36a of the guide projection 36. In this state, as shown in FIGS. 3 and 4, about half the axial length of the guide projection 36 is engaged into the guide groove 40c of the guide member 40. Hence, the ball screw shaft 24 is in a detent state. Since the stopper 25d abuts with the projection 36a of the guide projection 36 with the locking length Ld, the stopper 25d is locked at the guide projection 36 for restricting any further reverse rotation of the ball screw nut 22. Then, the ball screw shaft 24 reaches the rear side stroke end. In the stroke end, the ball screw shaft 24 stops its movement at a position where the rear end face of the ball screw shaft 24 is proximate to the bottom surface of the ball screw mechanism receiving portion 17 of the sub housing 11B.

In this way, according to the above first embodiment, it is possible to move the guide projections 36 and 37 along with the guide groove 40c formed in the guide member 40 in an axial direction, while keeping surface contact state therebetween. Hence, the uneven wear between the guide projections 36 and 37 and the guide groove 40c of the guide member 40 can be prevented for certainty. Moreover, since the guide member 40 is constructed with a separate member different from the main housing 11A on which the guide member 40 is mounted, the guide member 40 may be produced using a member having a high wear resistance, thus providing a guide member having a high wear resistance. In this instance, the material having a high wear resistance has only to be applied to the guide member 40, and the entire main housing 11A need not be made of a material having a high wear resistance. Thus, as this advantage attains low cost production as well as eliminates the need for use of a cam follower, the sizes of the guide projections 36 and 37 will not be increased.

Moreover, in place of a case where the guide member 40 is made of a member having a high wear resistance, the surface treatment may be applied to the guide groove 40c of the guide member 40 slidingly contact with the guide projections 36 and 37 for improving wear resistance and slidability. Even in this case, as the surface treatment has only to be applied to the guide member 40, it is possible to reduce the surface treatment cost.

Furthermore, central angles θ of the chords of the support holes 41a and 41b supporting the guide member 40 are set to be smaller than 180 degrees, and the lengths of the chords thereof are set shorter than the diameters of the support holes 41a and 41b, that is cross-sectional shapes of the support holes 41a and 41b are set to be larger than a semicircle. On that account, in assembling the guide member 40 so that the support holes 41a and 41b hold the guide member 40, it is possible to prevent the guide member 40 from falling off from the support holes 41a and 41b to the ball screw shaft 24 side.

Moreover, since the two guide projections 36 and 37 are provided at symmetry positions with respect to a axial line of the cylindrical member 25, it is made possible for the guide projections 36 and 37 to divide and share a reaction force generated at the time the guide projections 36 and 37 press the guide member 40, thereby reducing the possibility of the occurrence of wear.

Besides, according to the above first embodiment, when the ball screw shaft 24 reaches the stroke end toward the ball screw nut 22 side, the stopper 25d provided in the ball screw nut 22 is locked at the guide projection 36 of the detent member 34 having a detent function of the ball screw shaft 24, to thereby exhibit a stopper function.

Accordingly, the guide projection 36 may have both the detent and stopper functions, which eliminates the necessity of providing the stopper function with a separate member. This simplifies the structure and also reduces the number of component parts, thereby reducing the production cost.

When the ball screw shaft 24 reaches the stroke end, the guide projection 36 of the ball screw shaft 24 is in an engaged state with guide groove 40c, and the stopper 25d provided in the ball screw nut 22 abuts with the projection 36a projecting from the guide groove 40c of the guide projection 36. On that account, when input torque transmitted to the ball screw nut 22 is transmitted via the stopper 25d to the guide projection 36, the transmitted torque is received by the guide groove 40c through the guide projection 36, and further enters the main housing 11A from the guide groove 40c. This is because the guide projection 36 itself is engaged into the guide groove 40c. This securely prevents radial load acting on the ball screw shaft 24 and the ball screw nut 22.

Since the air hole 14d communicating the cylindrical body 14b with the breather 18 provided in the sub housing 11B is formed in the ball screw mechanism receiving portion 14a of the main housing 11A, it is possible to suppress air pressure fluctuations within the cylindrical body 14b from being generated, during advance or retreat of the ball screw shaft 24, and to secure a smooth movement of the ball screw shaft 24.

Further, the detent member 34 is secured to the ball screw shaft 24 by spline coupling the detent member 34 to the ball screw shaft 24, and by caulking the involute spline shaft. This enables adjustment of an axial position of the detent member 34 with the aid of a spacer such as a washer, etc., inserted therebetween. This also enables adjustment of a phase, at a peak of spline, in which the guide projection 36 and the stopper 25d of the ball screw nut 22 abut with each other. In other words, it is made possible to make fine adjustment of an axial end position at the stroke end of the ball screw shaft 24 (an example is that where a ball screw has a lead Ld and the number of teeth of spline is Z, the fitting with the detent member 34 shifted by one tooth results in shifting of the axial end position by Lb/Z).

By applying sealed bearing as the rolling bearings 21a and 21b that rotatably support the ball screw nut 22, it is possible to prevent interfusion of abrasion powders produced in the rolling bearings 21a and 21b into between the ball screw nut 22 and the ball screw shaft 24.

Further, in the above first embodiment, since an output shaft 12d of the electric motor 12 is set as the rear side, the ball screw nut 22 is coupled via the pinion gear 15 and the driven gear 26 to the output shaft 12d, and the coupling shaft 33 of the ball screw shaft 24 to be screwed into the ball screw nut 22 is projected forward, so that the axial length of the linear actuator 10 can be shortened.

While in the above first embodiment, an explanation has been made to the case where the two support holes 41a and 41b are formed in the main housing 11A to hold the guide member 40, and the two guide projections 36 and 37 are provided in the detent member 34 of the ball screw shaft 24. However, the present invention is not limited thereto, and one set or three or more sets of the guide members and the guide projections may be provided.

Whereas in the above first embodiment, an explanation has been made to the case where the fan-shaped stopper 25d is provided in the ball screw nut 22, the stopper 25d may take an arbitrary shape.

Moreover, while in the above first embodiment, an explanation has been made to the case where the guide projections 36 and 37 are provided on the outer peripheral surface of the cylindrical portion 35 to form the detent member 34, and the detent member 34 is spline coupled to the ball screw shaft 24. However, the present invention is not limited thereto, and an outer periphery may be formed into a square tube and the guide projections 36 and 37 may be provided on the outer periphery, as long as an involute spline hole is arranged on an inner periphery. In addition, the detent member 34 may be configured such that a prism portion is provided at the ball screw shaft 24 and the guide projections 36 and 37 are provided at the square tube to be engaged with the prism portion. Even in this case, an axial position of the detent member 34 is adjusted by means of a rectangular washer, etc. so that a stroke end position of the ball screw shaft 24 can be adjusted.

Further, while in the above first embodiment, an explanation has been made to the case where the electric motor 12 and the coupling shaft 33 of the ball screw mechanism 20 are juxtaposed. However, the present invention is not limited thereto, and the electric motor 12 may be juxtaposed with the ball screw 31 of the ball screw shaft 24.

Furthermore, whereas in the above first embodiment, an explanation has been made to the case where the electric motor 12 and the ball screw nut 22 of the ball screw mechanism 20 are coupled by the gear type of power transmission mechanism. However, the present invention is not limited thereto, and they may be coupled by the use of a belt type of power transmission system utilizing a pulley and a timing belt, and another type of power transmission mechanism.

Figure 16:
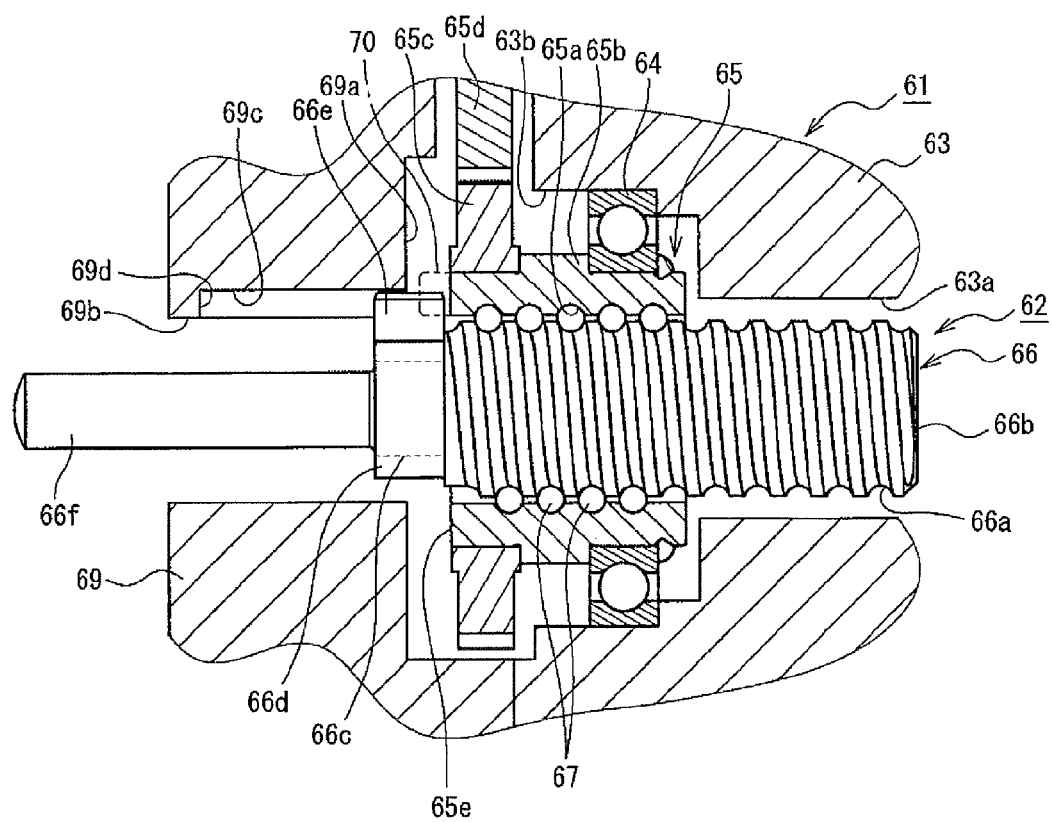
FIG. 16 is a cross-sectional view showing a second embodiment of the present invention.
Figure 17:
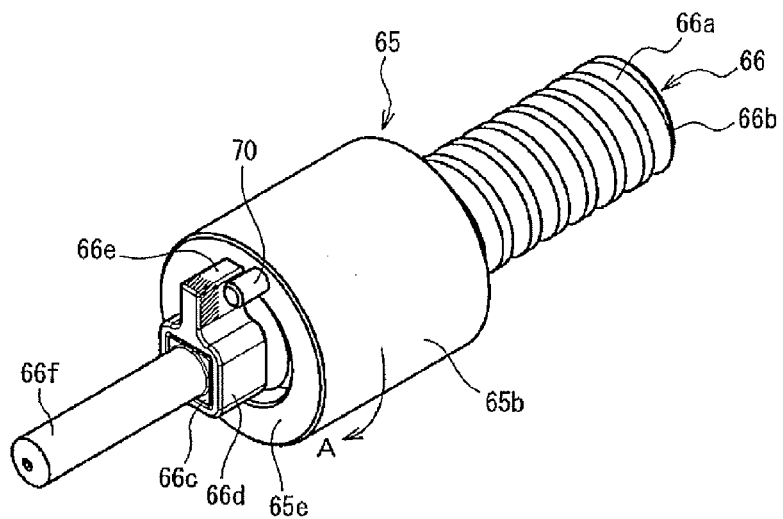
FIG. 17 is a perspective view showing a ball screw mechanism of FIG. 16.
Figure 18:
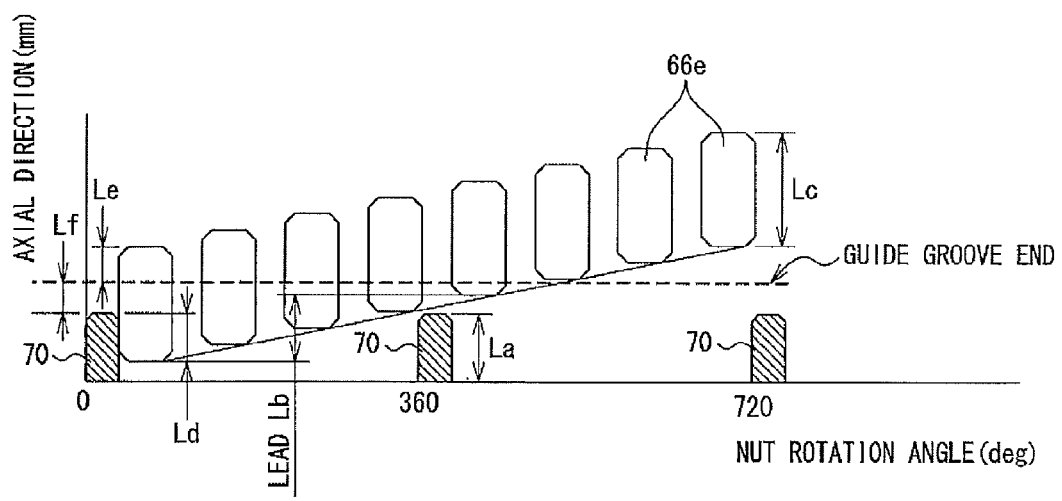
FIG. 18 is an explanation diagram showing a positional relationship between a guide projection and a locking member of the second embodiment.

An explanation will then be made to a second embodiment of the present invention with reference to FIGS. 16 to 18.

In the second embodiment, the guide member 40 and the support holes 41a and 41b are eliminated in the above-mentioned first embodiment.

Namely, the linear actuator 61 according to the second embodiment has, as shown in FIG. 16, a ball screw mechanism 62. The ball screw mechanism 62 is composed of: a ball screw nut 65 rotatably supported by the bearing 64 in a large-diameter hole portion 63b communicating with a central opening 63a formed as a securing portion in a housing 63; a ball screw shaft 66, as a linear motion component, to be screwed into the ball screw nut 65; and a lot of balls 67 interposed between the ball screw nut 65 and the ball screw shaft 66.

The ball screw nut 65 is made of a cylindrical member 65b on an inner peripheral surface on which a ball screw groove 65a is formed. One end of an outer peripheral surface of the cylindrical member 65b is rotatably supported via a bearing 64 by the housing 63, and the other end thereof is provided with a spur gear 65c fitted thereon. The spur gear 65c is meshed with a spur gear 65d coupled to a rotation axis of the electric motor as a rotation driving source, not shown. For this reason, the ball screw nut 65 is rotary driven with the rotational force of the electric motor.

In the ball screw nut 65, as shown in FIG. 17, a column-shaped locking piece 70 is provided as a locking portion in a projecting manner, at an outside position in an axial direction than the ball screw groove 65a on an axial end face 65e at the spur gear 65c side. When the locking piece 70 reaches the stroke end at the rear side of the ball screw shaft 66, the locking piece 70 abuts with an end face in a circumferential direction of the guide projection 66e of the ball screw shaft 66 to be mentioned later. Here, it is desirable that the locking piece 70 should be formed before the ball screw groove 65a of the ball screw nut 65, serving as a rotary motion component, is grooved, and the locking piece 70 should be taken as a reference for processing for at least one of a ball screw groove 25a and a circulating groove 25b.

The ball screw shaft 66 is inserted into the central opening 63a formed in the housing 63, and is composed of: a large-diameter portion 66b having an outer peripheral surface provided with a ball screw groove 66a; a guide projection 66e outwardly projecting than the large-diameter portion 66b in a radial direction from a square tube 66d fitted to a prism 66c provided at one end of the large-diameter portion 66b and from its one face; and a small-diameter shaft 66f connected to the prism 66c.

The axial length Lc of the guide projection 66e is, as shown in FIG. 18, set longer than that of the lead Lb of the ball screw groove 66a. That is, when Ld is the locking length between the guide projection 66e and the locking piece 70, Le is the locking length between the guide projection 66e necessary for detent and the guide groove 69c to be mentioned later, and Lf is a gap between an end of the locking piece 70 and an end face of the ball screw nut 65 side of the guide groove 69c, the axial length Lc of the guide projection 66e is set to:

$$Lc = Ld + Le + Lf > Lb \qquad (1)$$

where the locking length Ld is set shorter than that of the lead Lb (Ld<Lb).

At an end of the housing 63 for receiving the ball screw nut 65, a securing cover 69 as a securing portion is integrally secured by a securing member such as bolting. The securing cover 69 is formed with a receiving portion 69a for receiving the ball screw nut 65, the securing cover 69 being produced by die-cast molding alminiuum, and almimiun alloy, etc. In the securing cover 69, an insertion hole 69b having a diameter smaller than the central opening 63a of the housing 63 into which the small-diameter shaft 66f and the large-diameter portion 66b of the ball screw shaft 66 are inserted and larger than the large-diameter portion 66b of the ball screw shaft 66. On the inner peripheral surface side of the insertion hole 69b, there is provided a guide groove 69c to guide the guide projection 66e of the ball screw shaft 66. The guide groove 69c opens on the receiving portion 69a side and a stopper 69d abutting with the guide projection 66e is provided at the side opposite to the receiving portion 69a without opening.

An explanation will then be made to how to assemble the linear actuator 61 according to the above second embodiment.

Firstly, the ball screw shaft 66 is screwed via the ball 67 into the ball screw nut 65 to provide the ball screw mechanism 62. The ball screw nut 65 of the ball screw mechanism 62 is rotatably supported via the bearing 64 in the large-diameter portion 63b of the housing 63. The spur gear 65c fitted onto the ball screw nut 65 is meshed with the spur gear 65d connected to a rotation shaft of the rotational driving source such as the electric motor, etc.

Secondly, the securing cover 69 is attached to the housing 63. At this time, the securing cover 69 is attached, while engaging the guide projection 66e of the ball screw shaft 66 into the guide groove 69c of the securing cover 69. When the attachment is finished, the securing cover 69 is secured to the housing 63 by the securing means such as bolting, etc, and the assembly of the linear actuator 61 is completed.

In the assembly completed state, as shown in FIGS. 16 and 17, suppose that the locking piece 70 of the ball screw nut 65 abuts with an end face in a circumferential direction of the guide projection 66e of the ball screw shaft 66, and is located at the stroke end at the rear side in an axial direction. In this state, the guide projection 66e is, as shown in FIG. 16, engaged into the guide groove 69c of the securing cover 69 by about a half thereof in an axial direction.

From this state, in FIG. 17, the ball screw nut 65 is rotated in a direction of an arrow A. Then, as shown in FIG. 18, the locking piece 70 is spaced apart from the guide projection 66e by the rotation of the ball screw nut 65. At the same time, since the guide projection 66e is engaged into the guide groove 69c of the securing cover 69 and the ball screw shaft 66 is subject not to rotate, the ball screw shaft 66 advances in an axial direction and the guide projection 66e also advances.

When the ball screw nut 65 rotates one turn, as shown in FIG. 18, an end of the locking piece 70 of the ball screw nut 65 is separated from the rear end (right end face in FIG. 16) of the guide projection 66e, as is evident from a relationship of the locking length Ld<lead Lb. Thereby, the locking piece 70 will not abut with the end face in a circumferential direction of the guide projection 66e.

Thereafter, when the ball screw nut 65 continues to rotate and an end face of the small-diameter shaft 66f side of the guide projection 66e of the ball screw shaft 66 abuts with the stopper 69d of the securing cover 69, the advance of the ball screw shaft 66 is stopped, and the screw shaft 66 reaches the stroke end at the forward side. Normally, the advance of the ball screw shaft 66 is controlled, before the guide projection 66e of the ball screw 65 abuts with the stopper 69d.

After that, when the ball screw nut 65 is reversely rotated in a direction opposite to an arrow A, shown in FIG. 17, from a state where the ball screw shaft 66 is moving in a forward direction, the ball screw shaft 66 is subject not to rotate and retreats in an axial direction in accordance with the reverse rotation of the ball screw nut 65, as the guide projection 66e thereof is engaged into the guide groove 69c of the securing cover 69.

Then, when the guide projection 66e of the ball screw shaft 66 reaches a position (one turn short of the stroke end) facing the locking piece 70 of the ball screw nut 65, as mentioned above, a reverse rotation of the ball screw nut 65 is allowed, as is evident from a relationship of the locking length Ld<lead Lb.

Thus, the ball screw shaft 66 further retreats and the rear end of the guide projection 66e enters a trajectory at the end of the locking piece 70 provided in the ball screw nut 65. Finally, as shown in FIG. 17, the locking piece 70 abuts with an end face in a circumferential direction of the guide projection 66e. In this state, as shown in FIG. 16, the guide projection 66e engages into the guide groove 69c by about a half its axial length, and is in a detent state. Since the locking piece 70 abuts with the guide projection 66e in the detent state with the locking length Ld, further reverse rotation of the ball screw shaft 66 is restricted, and the ball screw shaft 66 reaches the stroke end on the rear side (right side in FIG. 16).

In this way, according to the second embodiment, the stroke end toward the ball screw nut 65 side of the ball screw shaft 66 may exhibit the stopper function by abutting with the locking piece 70 provided in the ball screw nut 65 to the guide projection 66e having the detent function of the ball screw shaft 66.

Accordingly, the guide projection 66e may have both the detent and the stopper functions, which eliminates the need for providing the stopper function with a separate member. This simplifies the structure as well as reduces the number of the parts, thereby reducing product cost.

Moreover, when the ball screw shaft 66 reaches the stroke end, the guide projection 66e of the ball screw shaft 66 is engaged into the guide groove 69c. The locking piece 70 provided in the ball screw nut 65 is locked to the projection projecting from the guide groove 69c of the guide projection 66e. For this reason, when the input torque transmitted to the ball screw nut 65 is transmitted via the locking piece 70 to the guide projection 66e, the transmitted torque is received via the guide projection 66e in the guide groove 69c. This certainly prevents an action of radial load on the ball screw shaft 66 and the ball screw nut 65.

While in the above second embodiment, an explanation has been made to the case where the locking piece 70 has a column shape. However, the present invention is not limited thereto, and the locking piece may be formed into a cylinder, a prism, or an arc prolonged in a circumferential direction, and therefore may take any shape.

An explanation will next be made to a third embodiment of the present invention with reference to FIGS. 19 and 20.

In the third embodiment, the locking member is formed of a spiral slope and a locking surface, by replacing the locking member with a locking piece.

Figure 19:
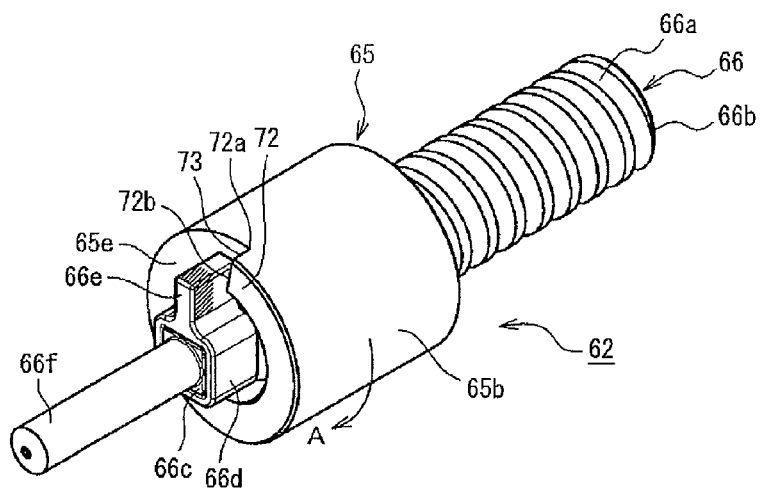
FIG. 19 is a perspective view showing a third embodiment of the present invention.

In other words, in the second embodiment, as shown in FIG. 19, the third embodiment has the same structure as that of the second embodiment shown in FIG. 17, excepting that the locking member provided in an end face of the spur gear 65c side of the ball screw nut 65 is composed of: a spiral slope 72 provided so that the axial projection length gets gradually longer, as the locking member goes in a circumferential direction of a counterclockwise direction from a start edge 72a, with a predetermined width in a radial direction on the inner peripheral side from one point of a peripheral line in the end face 65e of the spur gear 65c side of the ball screw nut 65; and a locking surface 73 locked to an end face in a circumferential direction of the guide projection 66e of the ball screw shaft 66 which is provided by extending in an axial direction toward the start edge 72a in an axial direction from the longest projection 72b facing the start edge 72a of the spiral slope 72. The component elements corresponding to those shown in FIG. 17 are denoted by the same reference numerals, and the detailed descriptions thereof will be omitted.

Figure 20:
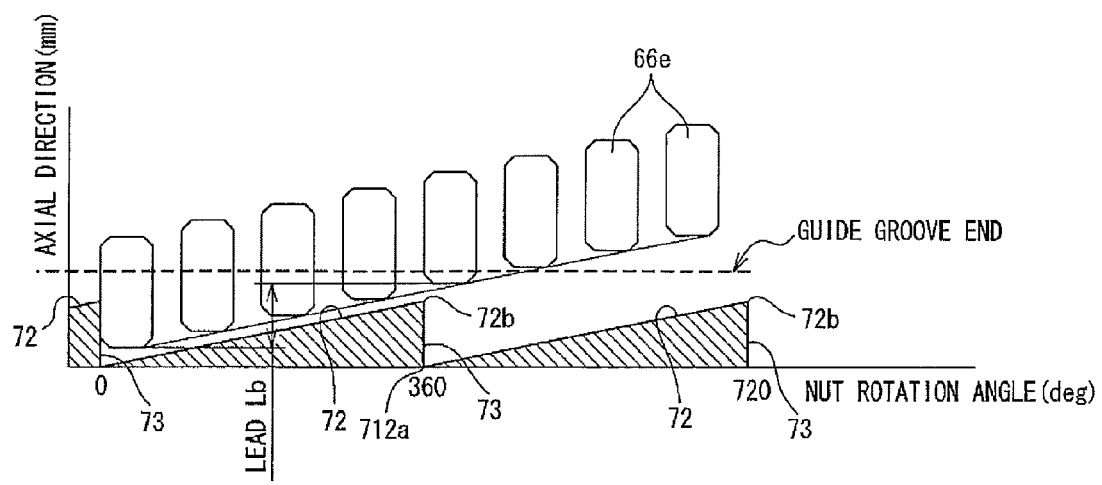
FIG. 20 is an explanation diagram showing a positional relationship between a guide projection and a locking member of the third embodiment.

According to the third embodiment, as shown in FIGS. 19 and 20, the ball screw nut 65 locked to an end face in a circumferential direction of the guide projection 66e of the ball screw shaft 66 is rotated in a direction of an arrow A shown in FIG. 19 from a state where a locking surface 73 is located at the stroke end at the rear side. As shown in FIG. 20, the locking surface 73 of the spiral slope 72 is spaced in a circumferential direction apart from the guide projection 66e in response to the rotation of the ball screw nut 65. At the same time, since the guide projection 66e is engaged into the guide groove 69c of the securing cover 69 to make the ball screw shaft 66 in a detent state, the ball screw shaft 66 advances in an axial direction and the guide projection 66e also advances simultaneously therewith.

When the ball screw nut 65 rotates one turn, as shown in FIG. 20, the locking surface 73 of the ball screw nut 65 is separated from the rear end of the guide projection 66e, and the locking surface 73 no longer abuts with an end face in a circumferential direction of the guide projection 66e.

Thereafter, the ball screw nut 65 continues to rotate and stops the advance of the ball screw shaft 66 at a desired position before an end face of the small-diameter shaft 66f side of the guide projection 66e of the ball screw shaft 66 abuts with the stopper 69d of the securing cover 69.

When the ball screw nut 65 is reversely rotated in a direction opposite to an arrow A shown in FIG. 19 from a state where the ball screw shaft 66 is moving forward, the ball screw shaft 66 is subject not to rotate and retreats in an axial direction with the reverse rotation of the ball screw nut 65, as the guide projection 66e of the ball screw shaft 66 is engaged into the guide groove 69c.

Then, when the guide projection 66e of the ball screw shaft 66 reaches a position (one turn short of the stroke end) facing a locking surface 73 of the ball screw nut 65, a reverse rotation of the ball screw nut 65 is allowed as mentioned above, as is evident from a relationship of the locking length Ld<lead Lb.

On that account, the ball screw shaft 6 further retreats and the rear end of the guide projection 66e enters a trajectory of the longest projection 72b provided in the ball screw nut 65. Finally, as shown in FIG. 20, the locking surface 73 abuts with an end face in a circumferential direction of the guide projection 66e. In this state, as with the aforesaid second embodiment, about a half the axial length of the guide projection 66e engages into the guide groove 69c to be in the detent state. Since the locking surface 73 abuts with the guide projection 66e, a further reverse rotation of the ball screw nut 65 is restricted, and the ball screw shaft 66 reaches the stroke end at the rear side.

In this manner, even in the third embodiment, since the stroke end toward the ball screw nut 65 side of the ball screw shaft 66 causes the locking surface 73 of the spiral slope 72 provided in the ball screw nut 65 to be locked at the guide projection 66e having a detent function of the ball screw shaft 66, a stopper function can be exerted.

Accordingly, the guide projection 66e may have both the detent and stopper functions, which eliminates the need for providing the stopper function with a separate member. This simplifies the structure as well as reduces the number of the parts, thereby reducing the product cost.

Further, when the ball screw shaft 66 reaches the stroke end, the guide projection 66e of the ball screw shaft is engaged into the guide groove 69c. The locking surface 73 formed in the ball screw nut 65 abuts with the projection projecting from the guide groove 69c of the guide projection 66e. Therefore, when the input torque transmitted to the ball screw nut 65 is transmitted via the locking surface 73 of the spiral slope 72 to the guide projection 66e, the transmitted torque is received by the guide groove 69c via the guide projection 66e. This certainly prevents an action of radial load on the ball screw shaft 66 and the ball screw nut 65.

According to the third embodiment, since the locking surface 73 is formed on an end face of the spiral slope 72, it is possible to provide high stiffness against a force in a circumferential direction of the locking surface 73. Also, the locking surface 73 repeatedly abuts with an end face in a circumferential direction of the guide projection 66e, which suppresses a fatigue failure, thereby ensuring a long service life.

Incidentally, while in the above third embodiment, an explanation has been made to the case where the spiral slope 72 is configured such that the circumference of the ball screw nut 65, i.e. the start edge 72a matches the longest projection 72b constituting the locking surface 73. However, the present invention is not limited thereto, and a slope of the spiral slope 12 may be steep and the slope length may be shorter than a circumference of a slope forming surface of the ball screw nut 65.

Further, while in the above second and third embodiments, an explanation has been made to the case where the prism 66c is provided in the ball screw shaft 66 so that the square tube 66d of the guide projection 66e is fitted to the prism 66c. However, the present invention not limited thereto, and a flat surface formed of a width across flat or either one face of them may be provided in the ball screw shaft 66, so that the guide projection may be fitted to the flat surface. In short, it has only to secure the guide projection 66e, extending in an axial direction to the ball screw shaft 66, not to be rotatable.

An explanation will next be made to a fourth embodiment of the present invention with reference to FIGS. 21 to 23.

In the fourth embodiment, only one guide member 40 is provided in the configuration of the aforesaid first embodiment.

Figure 21:
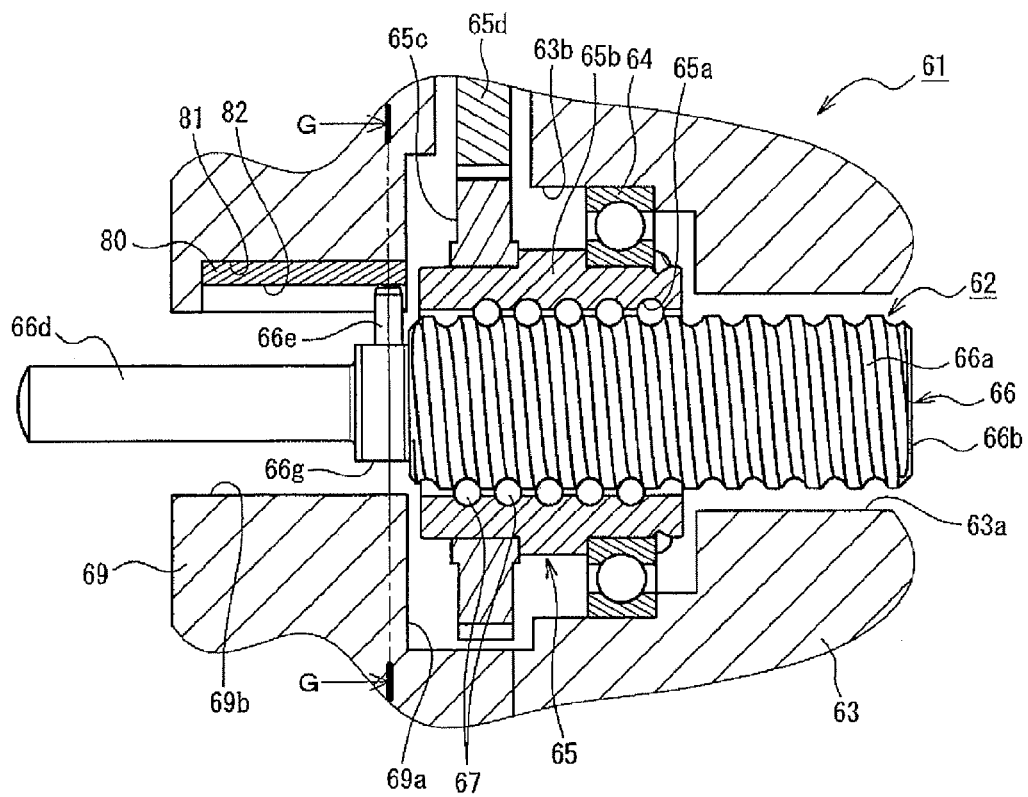
FIG. 21 is a cross-sectional view showing a fourth embodiment of the present invention.
Figure 22:
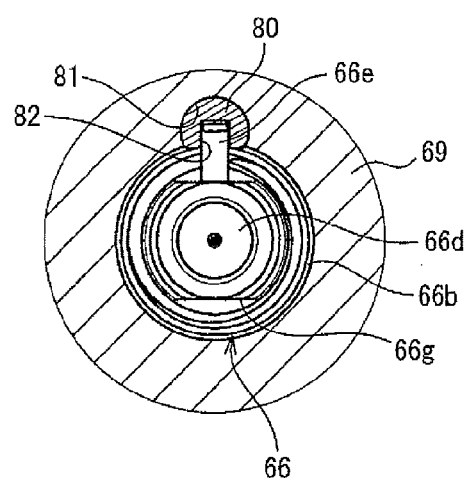
FIG. 22 is a cross-sectional view taken along a line G-G of FIG. 21.

Namely, in the fourth embodiment, as shown in FIGS. 21 and 22, has the same structure as the aforesaid second embodiment, excepting that the locking piece 70 is omitted, a guide member 80 is provided in place of the guide groove 69c of the securing cover 69, and the guide projection 66e of the ball screw shaft 66 is formed into a column shape and provided in a width across flat 66g provided in the ball screw shaft 66. The component elements corresponding to those shown in FIGS. 16 and 17 are denoted by the same reference numerals, and the detailed descriptions thereof will be omitted.

Herein, the guide member 80 is rotatably disposed in a support hole 81 formed in an axial direction on an inner peripheral surface facing the ball screw shaft 66 of the securing cover 69. The guide member 80 is made e.g. of steel, and is, as shown in FIGS. 22 and 23, made of a column 80c having a cylindrical surface 80a and a flat surface 80b formed by cutting with a chord having a length shorter than the diameter and having a central angle θ shorter than 180 degrees, when the column is viewed from a section, as shown in FIGS. 22 and 23. The column 80c has a cross-sectional shape similar to a semicircle or similar to a circle rather than the semicircle. At the center of the flat surface 80b, a guide groove 82 is formed which extends in an axial direction, is deeper than a central axis of the cylindrical surface 80a, and is slightly wider than the external diameter of the guide projection 66e of the ball screw shaft 66. The guide projection 66e of the ball screw shaft 66 is engaged into the guide groove 82. Then, the guide member 80 having the structure thus configured as above is formed by drawing a round bar using a die formed in the aforesaid cross-sectional shape to form a long shaped product, and then by cutting the product to a predetermined size.

The support hole 81 formed in the securing cover 69 is, as shown in FIG. 23, extended in an axial direction from the receiving portion 69a side to the other end side. The support hole 81 is formed into a cylindrical surface having an internal form substantially identical to an external form of the guide member 80, with reference to a section. A position corresponding to the chord of the aforesaid guide member 80 of the cylindrical surface is exposed to the insertion hole 69b. Here, the support hole 81 is set such that the central angle θ is smaller than 180 degrees, and the length of the chord is shorter than the diameter. When the guide member 80 is inserted into the support hole 81, the guide member 80 is prevented from falling off from the support hole 81 to project into the insertion hole 69b.

The guide member 80 is rotatably inserted into the support hole 81 of the securing cover 69 from the receiving portion 69a side, the guide groove 82 of the guide member 80 is disposed to face the insertion hole 69b, and the guide projection 66e of the ball screw shaft 66 is engaged into the guide groove 82.

Subsequently, the method of assembling the above linear actuator 10 can be carried out in the same way as that of the second embodiment as described above, excepting that the guide member 80 is inserted through the securing cover 69 to be mounted on the housing 63 in which the ball screw mechanism 62 is installed.

In the assembly completed state of the linear actuator 10, as shown in FIGS. 21 and 22, it comes to a state where the guide projection 66e of the ball screw shaft 66 is engaged into the guide groove 82 of the guide member 80. On this occasion, the guide groove 82 and the guide projection 66e are, as shown in FIG. 24A, selected such that the guide groove 82 slightly wider than the diameter of the guide projection 66e.

In this state, when the ball screw nut 65 is rotated in a clockwise direction in FIG. 24A by transmitting power via the spur gear 65d from a rotary driving source, not shown, to the spur gear 65c, the torque of the ball screw nut 65 is transmitted through the ball 67 to the ball screw shaft 66. Thereby, the ball screw shaft 66 is about to rotate in a clockwise direction of the same direction as that of the ball screw nut 65. At this moment, the guide projection 66e also rotates, as with FIG. 24B, in a clockwise direction, and falls into a state where the end of the guide projection 66e engages to the right side surface of the guide groove 82, coming into a point contact state.

However, the guide member 80 is rotatably supported by the support hole 81 of the securing cover 69. Thus, when the guide projection 66e is rotated in a clockwise direction, the right side surface of the guide groove 82 is pressed in a clockwise direction by the end of the guide projection 66e. Since this contact point is located on the upper side than a central axis of the guide member 80, the guide member 80 rotates in a clockwise direction, as shown in FIG. 24C, up to a state where the side surface of the guide projection 66e comes into a line contact state, following the right side surface of the guide groove 82, with the rotation of the guide projection 66e in a clockwise direction. The guide member 80 restricts the rotation of the guide projection 66e in a clockwise direction in the line contact state.

Hence, the ball screw shaft 66 is subject not to rotate and the ball screw shaft 66 moves to the left in FIG. 21, by continuing to rotate the ball screw nut 65 in a clockwise direction in FIG. 22. At this time, the ball screw shaft 66 moves in an axial direction under a condition where the guide projection 66e and the guide groove 82 maintain the line contact state shown in FIG. 24C. Therefore, the guide projection 66e is brought into the line contact with the guide groove 82, and prevents uneven wear in the guide projection 66e and the guide groove 82 even for long-term use.

Similarly, when the counterclockwise torque is transmitted to the ball screw shaft 66 in FIG. 22, the left side surface of the guide projection 66e comes into contact with the left side surface of the guide groove 82 in a line contact state and moves in an axial direction. Likewise, this certainly prevents uneven wear in the guide projection 66e and the guide groove 82.

In this manner, according to the above fourth embodiment, the guide projection 66e and guide groove 82 formed in the guide member 80 can be moved in an axial direction, while keeping the line contact state, thereby securely preventing the uneven wear. Moreover, since the guide member 80 is made of a separate member different from the securing cover 69 as a securing portion on which the guide member 80 is mounted, the guide member having a high wear resistance can be provided by forming the guide member 80 using the member having a high wear resistance. In this instance, since the material having a high wear resistance may be applied only to the guide member 80 to thereby eliminate the need for producing the entire securing cover 69 with a high wear resistant material, thereby reducing the manufacturing cost. Simultaneously, it is unlikely to incur enlargement of the guide projection 66e as there is no need to use the cam follower.

Alternatively, instead of the case where the guide member 80 is made of a member having a high wear resistance, surface treatment may be applied to the guide groove 82 slidingly in contact with the guide projection 66e, for improving the wear resistance and slidability. Even in this case, the surface treatment may be applied only to the guide member 80, thereby leading to cost reduction of the surface treatment.

Further, in the above fourth embodiment, the central angle θ of the chord of the support hole 81 supporting the guide member 80 is set smaller than 180 degrees, and the length of the chord is set shorter than the diameter of the support hole 81. In other words, a cross-sectional shape of the support hole 81 is formed into a shape over a semicircle. Therefore, during assembly to support the guide member 80 by the support hole 81, the guide member 80 is securely prevented from falling off to the ball screw shaft 66 side from the support hole 81.

Figure 25:
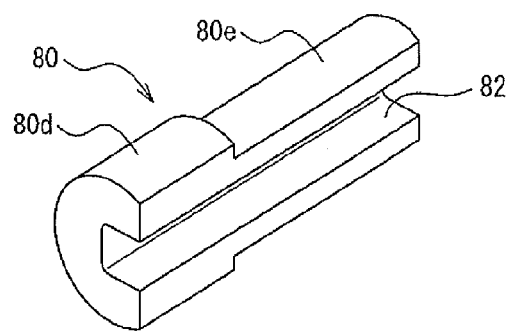
FIG. 25 is a perspective view showing a modification of a guide member in a fourth embodiment.
Figure 26:
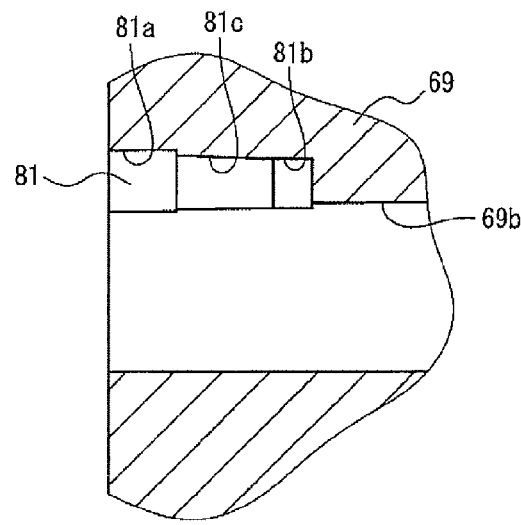
FIG. 26 is a cross-sectional view showing a support hole into which the guide member of FIG. 25 is fitted.
Figure 27:
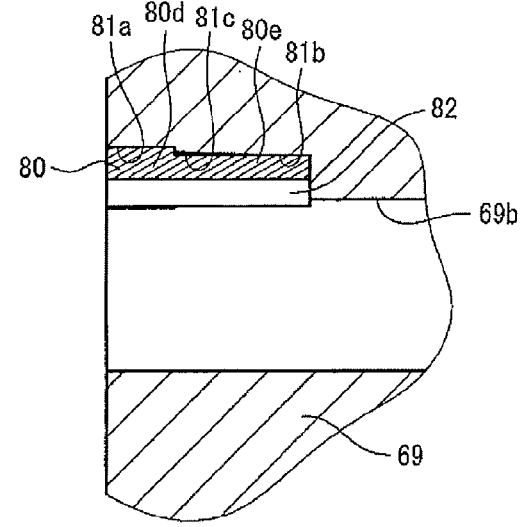
FIG. 27 is a cross-sectional view showing a state where the guide member is fitted into a support hole.
Figure 28A:
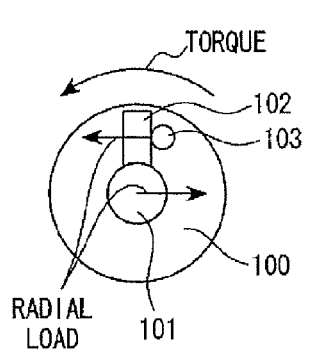
FIG. 28A is a front view.
Figure 28B:
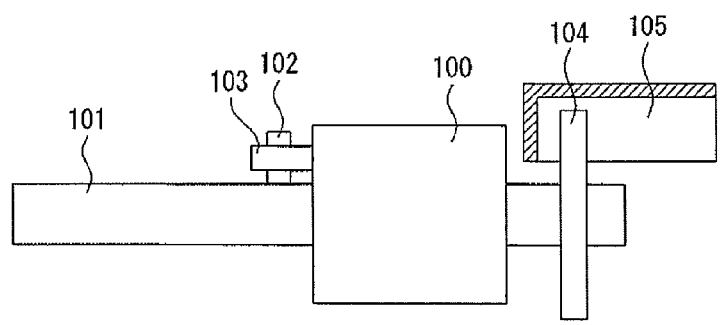
FIG. 28B is a side view.

While in the above fourth embodiment, an explanation has been made to the case where the diameter of the cylindrical surface of the guide member 80 is constant in an axial direction. However, the present invention is not limited thereto, and as shown in FIG. 25, the guide member 80 may be formed into a stepped cylindrical structure which is comprised of the large-diameter portion 80d and the small-diameter portion 80e coupled thereto. Like this, where the guide member 80 is formed into the stepped cylindrical structure, the guide member 80 is produced by sinter process.

Where the guide member 80 is formed into the stepped cylindrical structure as stated above, even for the support hole 81 formed in the securing cover 69, as shown in FIGS. 26 and 27, it is preferable for the guide member 80 to be composed of: a large-diameter portion 81a to receive the large-diameter portion 81d of the guide member 80; a back side small-diameter portion 81b to receive the small-diameter portion 80e of the guide member 80; and a tapered portion 81c to couple between the large-diameter portion 81a and the small-diameter portion 81b. With this structure, when the securing cover 69 is formed e.g. by die-cast molding, a casting surface (cutting taper) is formed between the large-diameter portion 81a and the small-diameter portion 81b of the support hole 81. Thereby, manufacturing spots are made smaller only to the large-diameter portion 81a and the small-diameter portion 81b so that the manufacturing spots may be reduced as compared with a case where a simple cylindrical surface is adopted, thereby achieving the improvement in processing accuracy.

Further, whereas in the fourth embodiment, as shown in FIG. 21, an explanation has been made to the case where the support hole 81 is formed in the upper side of the insertion hole 69b of the securing cover 69, the guide member 80 may be provided at any circumferential position of the insertion hole 69b.

Moreover, while in the above fourth embodiment, an explanation has been made to the case where one set of the guide projection 66e and the guide member 80 are provided. However, the present invention is not limited thereto, and a set of the guide projection 66e and the guide member 80 may be provided in multiple locations.

Moreover, while in the above fourth embodiment, an explanation has been made to the case where the guide projection 66e is formed into a cylinder. However, the present invention is not limited thereto, and it may be formed into any shape such as an elliptic cylinder and a prism, etc. In addition, whereas an explanation has been made to the case where the guide projection 66e is formed into the width across flat 66g, it is not always the width across flat 66g. One flat surface is left unchanged which forms the guide projection 66e, so that the other flat surface may be formed into a cylindrical surface.

Further, while in the above fourth embodiment, an explanation has been made to the case where the support hole 81 is formed in the securing cover 69. However, the present invention is not limited thereto, and the spur gear 65c of the ball screw nut 65 and the bearing 64 may be arranged in an inverse relation. Namely, the bearing 64 may be disposed at a position of the spur gear 65c, the spur gear 65c may be disposed at a position of the bearing 64, the securing cover 69 may be used as a housing as the securing portion, and the housing 63 may be taken as the securing cover. On this occasion, the support hole 81 rotatably supporting the guide member 80 is formed in the housing as the securing portion.

Furthermore, in the structure shown in FIG. 21, the guide projection 66e may be provided to the opposite side to the small-diameter shaft 66f of the large-diameter portion 66b of the ball screw shaft 66, and a support hole rotatably supporting the guide member 80 may be formed on an inner peripheral surface of the central opening 63a of the housing 63 as the securing portion.

While in the above first to fourth embodiments, explanations have been made to the case where the ball screw nuts 22 and 65 are rotary driven by the a rotary driving source, and the ball screw shafts 24 and 66 are each served as the linear motion component. However, the present invention is not limited thereto. The present invention may be applied to the case where the ball screw shafts 24 and 66 each are served as the rotary motion component to be rotated by the rotary driving source, and the ball screw nuts 22 and 65 are each served as the linear motion component.

While in the above first to fourth embodiments, explanations have been made to the case where steel is adopted for the material of the guide members 40 and 80. However, the present invention is not limited thereto, and it may fabricate with synthetic resin and ceramic, etc., and any material may be adoptable.

INDUSTRIAL APPLICABILITY

Since the guide projection may at least have a stopper function exhibiting the detent function of the linear motion component of the ball screw mechanism, the linear actuator can be provided for simplifying the structure as well as preventing the occurrence of radial load on the ball screw mechanism.

REFERENCE SIGNS LIST

10: linear actuator
11A: main housing
11B: sub housing
12: electric motor
13: motor mounting portion
14: ball screw mechanism mounting portion
15: pinion gear
16: pinion receiving portion
17: ball screw mechanism receiving portion
18: breather
20: ball screw mechanism
21a, 21b: rolling bearing
22: ball screw nut
23: ball
24: ball screw shaft
25a: ball screw groove
25b: circulating groove
25c: involute spline shaft
25d: stopper
26: driven gear
26a: involute spline hole
31: ball screw
32: involute spline shaft
33: coupling shaft
34: detent member
35: cylindrical portion
35a: involute spline hole
36: guide projection
36a: projection
37: guide projection
40: guide member
40a: cylindrical surface
40b: flat surface
40c: guide groove
40d: engage groove
41a, 41b: support hole
41c: projecting rib
50: seal
61: linear actuator
62: ball screw mechanism
63: housing
64: bearing
65: ball screw nut
66: ball screw shaft
66a: ball screw groove
66b: large-diameter portion
66c: prism
66d: square tube
66e: guide projection
66f: small-diameter shaft
66g: width across flat
67: ball
69: securing cover
70: locking piece
71: support hole
72: spiral slope
73: locking surface
80: guide member
80a: cylindrical surface
80b: flat surface
80c: column
80d: large-diameter portion
80e: small-diameter portion
81: support hole
81a: large-diameter portion
81b: small-diameter portion
81c: tapered portion
82: guide groove

The invention claimed is:

1. A linear actuator comprising:
a rotational motion component;
a linear motion component; and
a ball screw mechanism configured to convert a rotational motion transmitted to the rotational motion component into a linear motion, wherein
the ball screw mechanism has a guide projection projecting in a radial direction and provided in the linear motion component, and a guide groove engaged with the guide projection and disposed in a securing portion facing the linear motion component to guide the guide projection in an axial direction, and has a structure to make the linear motion component subject not to rotate,
the rotation of the guide projection is restricted at a shaft arranged in the linear motion component and a first position of the guide projection is adjustable in an axial direction, and is provided on a first outer peripheral surface of a cylindrical body with a shaft end position at the stroke end secured in such a manner that the axial end portion can be shifted along the axial direction, and the guide projection has a projection projecting by a predetermined length from the guide groove, while engaging into the guide groove, at a stroke end of the linear motion component, and abuts a abutting portion provided in the rotational motion component with the projection of the guide projection,
the guide groove is formed in a guide member having a second outer peripheral surface in the axial direction, and the guide member is fit into a support hole in a rotatable manner, the support hole being formed in the axial direction at a second position, facing the linear motion component, of the securing portion, the second outer peripheral surface has a cylindrical portion, the support hole has an inner circumference surface, and the guide member has an engage groove on the cylindrical portion, the engage groove being engaged with a projecting stripe formed on the inner peripheral surface, the projecting stripe extending along a circumferential direction of the inner circumference surface.

2. The linear actuator according to claim 1, wherein the guide projection is provided on the first outer peripheral surface of the cylindrical body on an inner peripheral surface where a spline hole is formed, and the cylindrical body is secured to the linear motion component with the spline hole engaged with a spline axis provided in the linear motion component.

3. The linear actuator according to claim 1, wherein the axial length of the guide projection is set longer than a lead of the ball screw mechanism.

4. The linear actuator according to claim 1, wherein the cylindrical portion of the second outer peripheral surface has a cross-sectional shape having a first circular form with a first center angle of more than 180 degrees, and the inner circumference surface has a cross-sectional shape having a second circular form with a second center angle of more than 180 degrees.

5. The linear actuator according to claim 4, wherein
the second outer peripheral surface is formed of the cylindrical portion and a plane portion connecting both ends of the cylindrical portion, and
the guide groove is formed in the plane portion.

6. The linear actuator according to claim 1, wherein the guide projection has a projection projecting by a predetermined length, while engaging in the guide groove, at a stroke end of the linear motion component, and a locking portion provided in the rotational motion component is locked to the projection.

7. The linear actuator according to claim 1, wherein a pair of the guide projections are provided in the linear motion component at a corresponding position with respect to a central axis of the linear motion component, a pair of the support holes are formed at a symmetrical position with respect to a central axis of the linear motion component of the securing portion, a pair of the guide members are rotatably held in the pair of the support holes, respectively, and the pair of the guide projections are engaged into the guide grooves of the pair of the guide members, respectively.

8. The linear actuator according to claim 1, wherein the guide member is formed by cutting a long member to a predetermined length manufactured by punching.

9. The linear actuator according to claim 1, wherein
an external form of the guide member is formed of a large-diameter portion and a small-diameter portion, and
the support hole has a large-diameter hole and a small-diameter hole respectively engaging to the large-diameter portion and the small-diameter portion of the guide member, and a tapered portion connecting the large-diameter hole to the small-diameter hole.

10. The linear actuator according to claim 1, wherein the guide member is manufactured by a sintered product.

11. The linear actuator according to claim 1, wherein the abutting portion is integrally provided in the rotational motion component, is molded before grooving of at least one of a ball screw groove and a circulating groove of the rotational motion component, and established as a machining reference level for at least one of the ball screw groove and the circulating groove.

12. The linear actuator according to claim 2, wherein the axial length of the guide projection is set longer than a lead of the ball screw mechanism.

13. A linear actuator comprising:
a rotational motion component;
a linear motion component; and
a ball screw mechanism configured to convert a rotational motion transmitted to the rotational motion component into a linear motion, wherein
the ball screw mechanism has a guide projection projecting in a radial direction and provided in the linear motion component, and a guide groove engaged with the guide projection disposed in a securing portion facing the linear motion component to guide the guide projection in an axial direction, and has a structure to make the linear motion component subject not to rotate,
the guide groove is formed in a guide member having a cylindrical outer peripheral surface in an axial direction, and the guide member is fit into a support hole in a rotatable manner, the support hole being formed in an axial direction at a position facing the linear motion component of the securing portion,
the support hole has an inner circumference surface, and
the guide member has an engage groove on the cylindrical outer peripheral surface, the engage groove being engaged with a projecting stripe formed on the inner peripheral surface, the projecting stripe extending along a circumferential direction of the inner circumference surface.

* * * * *